United States Patent
Ohta

(10) Patent No.: US 10,321,427 B2
(45) Date of Patent: **\*Jun. 11, 2019**

(54) WIRELESS COMMUNICATION SYSTEM, MOBILE STATION AND BASE STATION

(71) Applicant: FUJITSU LIMITED, Kawasaki-shi, Kanagawa (JP)

(72) Inventor: Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,723

(22) Filed: Sep. 19, 2017

(65) Prior Publication Data

US 2018/0063806 A1 Mar. 1, 2018

Related U.S. Application Data

(63) Continuation of application No. 14/483,812, filed on Sep. 11, 2014, now Pat. No. 9,801,149, which is a
(Continued)

(51) Int. Cl.
*H04W 56/00* (2009.01)
*H04W 72/04* (2009.01)
(Continued)

(52) U.S. Cl.
CPC ......... *H04W 56/0045* (2013.01); *H04L 5/001* (2013.01); *H04W 72/0453* (2013.01);
(Continued)

(58) Field of Classification Search
None
See application file for complete search history.

(56) References Cited

U.S. PATENT DOCUMENTS 9,210,676 B2 \* 12/2015 Dinan ............... H04W 56/0005
2012/0250520 A1 \* 10/2012 Chen ....................... H04L 5/001
370/241
(Continued)

OTHER PUBLICATIONS

3GPP TR 36.912 V10.0.0,3rd Generation Partnership Project; Technical Specification Group Radio Access Network; Feasibility study for Further Advancements for E-UTRA (LTE-Advanced), (Release 10), Mar. 2011.
(Continued)

*Primary Examiner* — Donald L Mills
(74) *Attorney, Agent, or Firm* — Myers Wolin, LLC

(57) ABSTRACT

A base station for wireless communication with a mobile station using a plurality of cells configured to be grouped so as to comprise a plurality of groups of cells. The base station includes: circuitry configured to transmit a first control signal having a first field and a second field, the first field including information indicating an amount of adjustment for the mobile station to use to adjust a transmission timing of the mobile station with one or more cells, and the second field being configured to store second information identifying the one or more cells among the plurality of groups of cells, and transmit a second control signal having a third field configured to include a unique identifier of one or more of the plurality of cells, according to which the second information set in the second field of the first control signal is applied to the mobile station.

10 Claims, 31 Drawing Sheets

Related U.S. Application Data continuation of application No. PCT/JP2012/001878, filed on Mar. 16, 2012.

(51) Int. Cl.

| | |
|---|---|
| *H04L 5/00* | (2006.01) |
| *H04W 36/00* | (2009.01) |
| *H04W 76/20* | (2018.01) |
| *H04W 76/10* | (2018.01) |

(52) U.S. Cl.
CPC ....... *H04L 5/0091* (2013.01); *H04W 36/0055* (2013.01); *H04W 76/10* (2018.02); *H04W 76/20* (2018.02)

(56) References Cited

U.S. PATENT DOCUMENTS

| | | | | |
|---|---|---|---|---|
| 2012/0257510 A1* | 10/2012 | Jeong | ................... | H04L 5/0098 370/242 |
| 2012/0257569 A1* | 10/2012 | Jang | ..................... | H04W 76/19 370/328 |
| 2012/0257570 A1* | 10/2012 | Jang | ..................... | H04W 76/19 370/328 |
| 2012/0281548 A1* | 11/2012 | Lin | ...................... | H04W 76/18 370/242 |
| 2012/0300752 A1* | 11/2012 | Kwon | ............... | H04W 56/0005 370/336 |
| 2013/0028185 A1* | 1/2013 | Wu | ................... | H04W 56/0005 370/328 |
| 2013/0064195 A1* | 3/2013 | Chang | .............. | H04W 36/0077 370/329 |
| 2013/0114398 A1* | 5/2013 | Wang | ................. | H04W 76/048 370/221 |
| 2013/0188613 A1* | 7/2013 | Dinan | .............. | H04W 56/0005 370/336 |
| 2014/0286240 A1* | 9/2014 | Kim | ................. | H04W 56/0005 370/328 |

OTHER PUBLICATIONS

3GPP TS 36.321 V10.4.0, 3rd Generation Partnership Project; Technical Specification Group Radio Access Network; Evolved Universal Terrestrial Radio Access (E-UTRA); "Medium Access Control (MAC) protocol specification", (Release 10), Dec. 2011.
3GPP TS 36.331, V10.4.0, 3rd Generation Partnership Project; Technical Specification Group Radio Access Network; Evolved Universal Terrestrial Radio Access (E-UTRA; "Radio Resource Control (RRC); Protocol specification", (Release 10),Dec. 2011.
Nokia Siemens Networks et al., "MAC Downlink Signalling for Multiple TA", 3GPP TSG-RAN WG2 Meeting #75bis, Zhuhai, China Oct. 10-14, 2011, R2-114939.
Sharp, "TA group handling", Agenda Item: 7.1.2.3, 3GPP TSG-RAN WG2#77, Dresden, Germany, Feb. 6-10, 2012, R2-120218.
International Search Report issued for corresponding International Patent Application No. PCT/JP2012/001878, dated Apr. 10, 2012, with English translation attached.
Notification of Office Action issued by the State Intellectual Property Office of China for corresponding Chinese Patent Application No. 201280071433.5, dated Jul. 3, 2017, with an English translation.
InterDigital Communications, "MAC Timing Advance Command Control Element for SCells", Agenda Item: 7.1.2.4, 3GPP TSG-RAN WG2 #77, R2-120636 (R2-116113), Dresden, Germany, Feb. 4-10, 2012.
LG Electronics Inc., "TAC MAC CE and multiple timing advances", Agenda Item: 7.1.2.4, 3GPP TSG-RAN2 Meeting #77, R2-120707, Dresden, Germany, Feb. 6-10, 2012.
Extended European search report with the supplementary European search report and the European search opinion issued for corresponding European Patent Application No. 12871356.7 dated Feb. 20, 2015.
Non-Final Office Action issued by the United States Patent and Trademark Office for corresponding U.S. Appl. No. 14/483,812, dated Jun. 16, 2016.
Final Office Action issued by the United States Patent and Trademark Office for corresponding U.S. Appl. No. 14/483,812, dated Jan. 27, 2017.
Advisory Action Before the Filing of an Appeal Brief issued by the United States Patent and Trademark Office for corresponding U.S. Appl. No. 14/483,812, dated May 26, 2017.
Communication pursuant to 94(3) EPC issued by the European Patent Office for corresponding European Patent Application No. 12 871 3561 1-1220, dated Mar. 5, 2018.
Third Notification of Office Action issued by the State Intellectual Property Office of China for corresponding Chinese Patent Application No. 201280071433.5, dated Aug. 17, 2018, with an English translation.
Decision of Rejection issued by the China National Intellectual Property Administration for corresponding Chinese Patent Application No. 201280071433.5, dated Feb. 19, 2019, with an English translation.

\* cited by examiner

FIG. 5

RRCConnectionReconfiguration message

```
-- ASN1START

RRCConnectionReconfiguration ::=    SEQUENCE {
    rrc-TransactionIdentifier       RRC-TransactionIdentifier,
    criticalExtensions              CHOICE {
        c1                          CHOICE{
            rrcConnectionReconfiguration-r8     RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}

RRCConnectionReconfiguration-r8-IEs ::= SEQUENCE {
    measConfig                  MeasConfig                              OPTIONAL,   -- Need ON
    mobilityControlInfo         MobilityControlInfo                     OPTIONAL,   -- Cond HO
    dedicatedInfoNASList        SEQUENCE (SIZE(1..maxDRB)) OF
                                DedicatedInfoNAS                        OPTIONAL,   -- Cond nonHO
    radioResourceConfigDedicated RadioResourceConfigDedicated           OPTIONAL,   -- Cond HO-toEUTRA
    securityConfigHO            SecurityConfigHO                        OPTIONAL,   -- Cond HO
    nonCriticalExtension        RRCConnectionReconfiguration-v890-IEs   OPTIONAL
}

RRCConnectionReconfiguration-v890-IEs ::= SEQUENCE {
    lateNonCriticalExtension    OCTET STRING                            OPTIONAL,   -- Need OP
    nonCriticalExtension        RRCConnectionReconfiguration-v920-IEs   OPTIONAL
}

RRCConnectionReconfiguration-v920-IEs ::= SEQUENCE {
    otherConfig-r9              OtherConfig-r9                          OPTIONAL,   -- Need ON
    fullConfig-r9               ENUMERATED (true)                       OPTIONAL,   -- Cond HO-Reestab
    nonCriticalExtension        RRCConnectionReconfiguration-v1020-IEs  OPTIONAL
}
```

| TAG ID for Scell #1 | TAG ID for Scell #2 | TAG ID for Scell #3 | TAG ID for Scell #4 | | Oct1 |
| TAG ID for Scell #5 | TAG ID for Scell #6 | TAG ID for Scell #7 | R | R | Oct2 |

FIG. 10B

| R | R | TAG ID for Scell #1 | TAG ID for Scell #2 | TAG ID for Scell #3 | Oct1 |
| TAG ID for Scell #4 | | TAG ID for Scell #5 | TAG ID for Scell #6 | TAG ID for Scell #7 | Oct2 |

WIRELESS COMMUNICATION SYSTEM, MOBILE STATION AND BASE STATION

CROSS-REFERENCE TO RELATED APPLICATION

This application is a continuation of U.S. application Ser. No. 14/483,812, filed Sep. 11, 2014, which is a continuation application of International Application PCT/JP2012/001878 filed on Mar. 16, 2012, the entire contents of which are incorporated herein by reference.

FIELD

The present disclosure relates to a wireless communication system, mobile station, and base station that perform wireless communication using a plurality of frequency carriers.

BACKGROUND

In a wireless communication system, a mobile station determines a transmission timing for a base station based on a timing advance (TA) transmitted from the base station. Accordingly, if the transmission timing of the mobile station deviates, the base station notifies the mobile station of a new TA to maintain synchronization of a radio signal from the mobile station to the base station and corrects the transmission timing of the mobile station.

Specifically, if the base station detects a deviation in the transmission timing when receiving the radio signal from the mobile station, the base station calculates the correction value of a TA, includes this correction value in a TA command (TAC), and notifies the mobile station of the TAC. Upon receiving the TAC, the mobile station corrects the TA being used based on the correction value of the TA included in the TAC, and uses the corrected TA as a new TA. This corrects the transmission timing of the mobile station.

In Long Term Evolution Advanced (LTE-A), a technique called carrier aggregation is adopted. Carrier aggregation of LTE-A Release 11 (referred to below as R11) will be described briefly below.

In carrier aggregation of LTE-A Release 10 (referred to below as R10), only the cells with the same transmission timing are aggregated. However, in carrier aggregation of LTE-A Release 11, a group of cells with different transmission timings is aggregated and a TAG (timing advance group) is set for each group of cells by transmission timing.

For example, a primary timing advance group (pTAG) is set for a group of cells, with a first transmission timing, that includes primary cells (PCells). A secondly taming advance group (sTAG) is set for a group of cells, with a second transmission timing, that includes only secondly cells (SCells).

Accordingly, when detecting a deviation in the timing of a radio signal received from cells belonging to TAGs, the base station of R11 calculates the correction value of a TA for each TAG, includes the TA in the TAC, and notifies the mobile station of the TAC. At this time, the identifier of the TAG is included in the TAC to clearly indicate the TAG to which the cell to which the TA is applied belongs. The mobile station identifies the TAG (group of cells) based on the identifier included in the TAC and applies the TA to the group of cells belonging to the TAG.

CITATION LIST

Non Patent Literature

NPL 1: 3GPP TS36.912, "Further Advancements for E-UTRA (LTE-Advanced)", V10.0.0, Release 10, March 2011

NPL 2: 3GPP TS36.321, "Medium Access Control (MAC) Protocol Specification", V10.4.0, Release 10, December 2011

NPL 3: 3GPP TS36.331, "Radio Resource Control (RRC) Protocol Specification", V10.4.0, Release 10, December 2011

SUMMARY

According to an aspect of the invention, a base station that performs wireless communication with a mobile station using a plurality of cells, the base station includes: a wireless communication circuitry configured to transmit a first control signal that includes first information used to adjust a transmission timing of the mobile station with the cells and second information that is different from the first information, and a second control signal that includes information indicating whether the second information is used to specify a cell among the cells; and a controller configured to perform control for transmission of the first control signal and the second control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 depicts an example of codes of RRC connection reconfiguration information of R11 according to an embodiment (part 1);

FIG. 6 depicts an example of codes of RRC connection establishment information of R11 according to the present embodiment (part 2);

FIGS. 10A-10B depicts examples of a MAC_CE format;

DESCRIPTION OF EMBODIMENTS

Embodiments of a mobile station, base station, wireless communication system, and wireless communication method disclosed by the present application will be described below with reference to the drawings.

Before describing embodiments of the present application, a wireless communication system and a wireless communication method underlying the embodiments will be described. Unless otherwise specified, a cell is taken as synonymous with a carrier.

In LTE, which is the next generation mobile communication system, a system based on orthogonal frequency division multiplexing (OFDM) is defined as a wireless access technique. LTE enables high speed wireless packet communication with a peak downstream transmission rate of 100 Mbps or more and a peak upstream transmission rate of 50 Mbps or more.

3rd Generation Partnership Project (3GPP), an international standardization organization, is currently discussing LTE-A, an LTE-based mobile communication system, toward the realization of a faster communication.

LTE-A aims at a peak downstream transmission rate of 1 Gbps and a peak upstream transmission rate of 500 Mbps and various new techniques such as a wireless access method and network architecture are being discussed. The specification of R10, the first release of LTE-A, has been almost defined at present and the specification of R11 is being defined.

In LTE-A, a wireless communication method for transmitting a larger capacity of data by aggregating the frequency bands of wireless carriers (LTE carriers) used by the LTE system has been discussed to achieve high speed communication. This method is referred to as carrier aggregation (frequency aggregation). The LET carriers to be aggregated are also referred to as component carriers.

Carrier aggregation of R11 will be described in details below.

Figure 1:
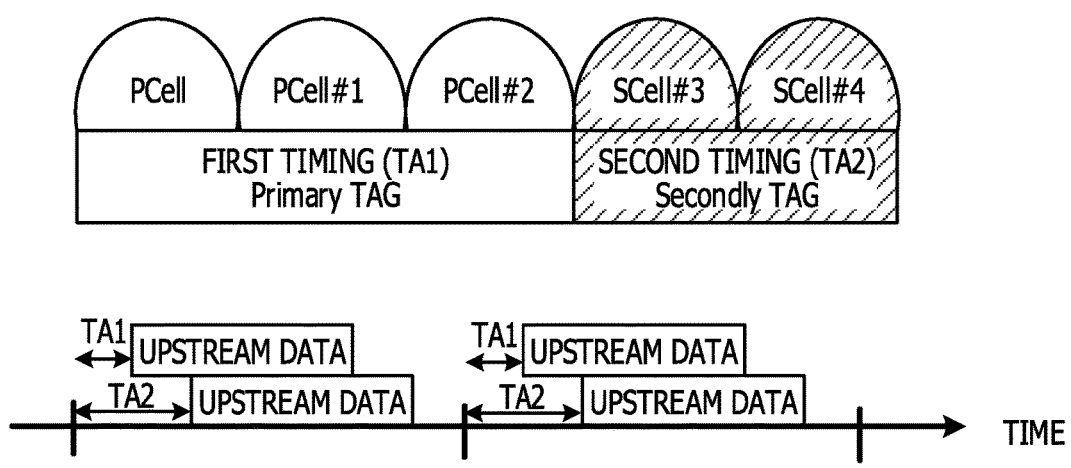
FIG. 1 schematically depicts carrier aggregation of R11.

FIG. 1 schematically depicts the carrier aggregation of R11.

In FIG. 1, PCell and SCell#1 to SCell#4 are component carriers. PCell is a carrier used to perform various types of important control such as transmission of upstream control data. SCell#1 to SCell#4 are additional carriers used to improve throughput. In LTE-A, these component carriers are used to transmit or receive data between a mobile station (UE) and a base station (eNB), for example.

In addition, LTE-A R11 enables cells (carriers) with different upstream transmission timings to be aggregated.

For example, in FIG. 1, a group of cells (PCell, SCell#1, and SCell#2) with the first transmission timing TA1 (timing advance 1) and a group of cells (SCell#3 and SCell#4) with the second transmission timing TA2 (timing advance 2) are aggregated. The group of cells including a PCell is referred to as a primary timing advance group (pTAG) and the group of cells including only SCells is referred to as a secondly timing advance group (sTAG).

For identification between a pTAG and a sTAG, a unique identifier (that is, a TAG identifier) is assigned to each TAG. In the present embodiment, "0" is assigned to the TAG identifier of a pTAG and non-zero values are assigned to the TAG identifiers of sTAGs. This is true in the following embodiments.

Although cells with two different transmission timings are aggregated for convenience of explanation, cells with three or more different upstream transmission timings may be aggregated.

Next, the procedure for performing communication between a mobile station and a base station will be described.

Figure 2:
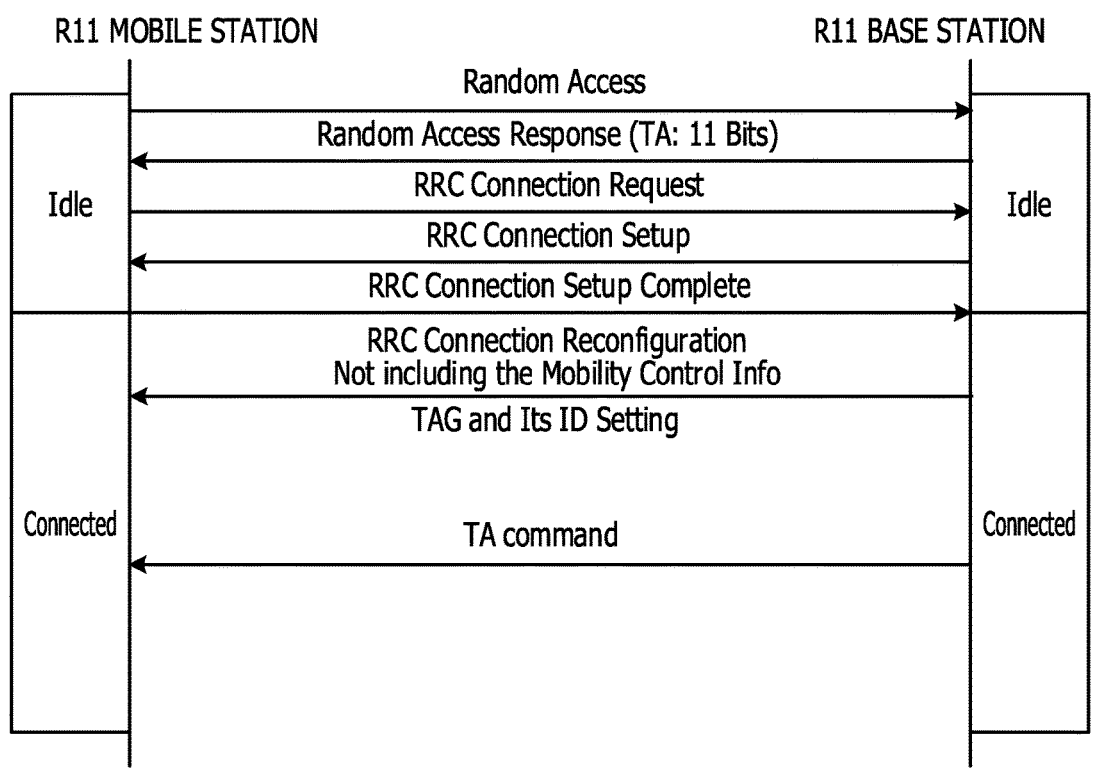
FIG. 2 depicts a sequence of connection between a mobile station and a base station.

FIG. 2 depicts a sequence of connection between a mobile station and a base station.

As depicted in FIG. 2, to perform communication between a mobile station and a base station, it is desired that the state of radio resource control (RRC) be shifted from RRC idle mode to RRC connected mode.

For initial access from a mobile station to a base station, the mobile station transmits a random access signal (random access preamble) to the base station. The base station calculates a TA for determining the transmission timing based on the random access signal from the mobile station. Next, the base station notifies the mobile station of the TA as a random access response. Since the mobile station transmits the random access signal with upstream synchronization lost in this case, the base station sets a long reception period. When the mobile station receives a random access response from the base station and applies the TA value as the upstream transmission timing, upstream synchronization is achieved. Subsequently, the mobile station performs upstream transmission with the timing of the TA reported from the base station. Now, the initial synchronization is completed. The TA in this case is 11 bits in length because it is an absolute value that does not reference the upstream transmission timings.

Next, the mobile station performs an RRC connection establishment procedure at the upstream transmission timing corrected based on the TA. Specifically, the mobile station transmits a RRC connection request to the base station. Upon receiving a RRC connection setup from the base station, the mobile station notifies the base station of RRC connection setup complete. Through the above procedure, the state of RRC is shifted from RRC idle mode to RRC connected mode to enable communication between the mobile station and the base station.

In addition, upon completion of RRC connection establishment, the base station transmits RRC connection reconfiguration information (RRC connection reconfiguration not including the mobility control info) to the mobile station and sets radio parameters appropriate for the mobile station.

After setting radio parameters, the base station performs monitoring to determine whether the upstream radio signal received from the mobile station with which the upstream synchronization state is established is received within the reception section owned by the base station. Upon detecting a deviation in the reception timing, the base station calculates the correction value of the upstream transmission timing as a TA to correct the deviation. In addition, the base station includes the TA in a TAC and notifies the mobile station of the TAC. Upon receiving the TAC, the mobile station corrects the TA currently used, based on the TA included in the TAC and uses the corrected TA as a new TA. Unlike the initial synchronization described above, the base station is only desired to report a relative value, which is a correction value relative to the current TA, so the TA is six bits in length, which is smaller than 11 bits in the initial synchronization.

Next, the format of a TAC will be described.

FIGS. 3(a) to 3(d) depict examples of the format of a TAC.

A TAC is defined by a MAC control element (MAC_CE), which is a control signal for the media access control (MAC) layer. Various control commands for the MAC layer are transmitted by MAC_CE and the types of control commands are decided by logical channel identifiers (LCIDs) accompanying the MAC header. An LCID of 11101 is assigned to a TAC.

Figure 3A:
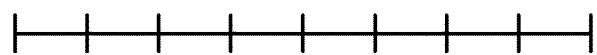
FIGS. 3A-3D depicts examples of the format of TAC.

FIG. 3(a) depicts a TAC format transmitted by a base station that does not support a TAG. In transmission of packets, since data is configured in units of bytes, when a TA used is six bits in length, the remaining two bits are desired to be set to certain bits arbitrarily. Such arbitrarily set bits are referred to as reserved bits. For example, an LTE base station or an LTE-A R10 base station transmits a TAC in this format. In the format in FIG. 3(a), the first two bits are reserved bits R and the subsequent six bits stores a TA. An arbitrary value is set in reserved bits R by the base station.

Figure 3B:
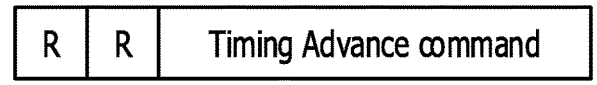
Figure 3C:
Figure 3D:
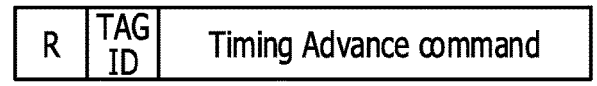

FIGS. 3(b) to 3(d) depict examples of the TAC format transmitted by a base station that supports a TAG. An LTE-A R11 base station transmits a TAC in any of these formats.

In the format in FIG. 3(b), the first bit defines a TAG identifier, the next bit is a reserved bit, and the subsequent six bits stores a TA.

In the format in FIG. 3(c), the first bit is a reserved bit, the next bit defines a TAG identifier, and the subsequent six bits stores a TA.

In the format in FIG. 3(d), the first two bits define a TAG identifier and the subsequent six bits stores a TA.

That is, the LTE-A R11 base station defines the TAG identifier using any bits of the formats in FIGS. 3(b) to 3(d). In the following embodiments, the TAC of the format in FIG. 3(d) is used for description. Accordingly, the TAG identifier is defined by the first two bits of the TAC.

Next, problems with a wireless communication system and a wireless communication method underlying the present embodiment will be described.

The mobile station of R11 has TAG setting information as the initial parameter. However, the base station of R10 has no function of setting a TAG (FIG. 3(a)). Accordingly, the base station of R10 embeds any series of bits in the first two bits, reserved bits R, of a TAC to be transmitted to a mobile station. Accordingly, the mobile station of R11 misidentifies the first two bits (reserved bits R) as significant and is not able to adjust the upstream transmission timing correctly for each TAG.

For example, if the Rel number of the system is shared between the mobile station of R11 and the base station of R10, the mobile station is able to recognize that it is connected to a base station with a release number different from its release number. Accordingly, if the mobile station ignores first two bits R set for the TAC, the above problem is resolved.

However, the LTE communication system is designed so as to perform communication without sharing the release number of a system between a mobile station and a base station. Therefore, a mobile station is not able to determine whether it is connected to a base station with a release number different from its release number.

Accordingly, in embodiments 1 and 2, even if a mobile station of R11 connects to a base station of a release other than R11, for example, it is possible to process a TAC appropriately without sharing the release number.

[Embodiment 1]

Next, embodiment 1 will be described with reference to FIGS. 4 to 12.

In the present embodiment, a wireless communication method of a wireless communication system including a mobile station and a base station will be described, but the present disclosure is not limited to this example. For example, it is possible to apply the wireless communication method of the present embodiment to a system including a relay station and a base station. In this case, the relay station corresponds to a mobile station. In addition, it is possible to apply the wireless communication method of the present embodiment to a system including a mobile station and a relay station. In this case, the relay station corresponds to a base station.

(Mobile Station 10)

Next, the functional blocks of the mobile station 10 according to the present embodiment will be described.

Figure 4:
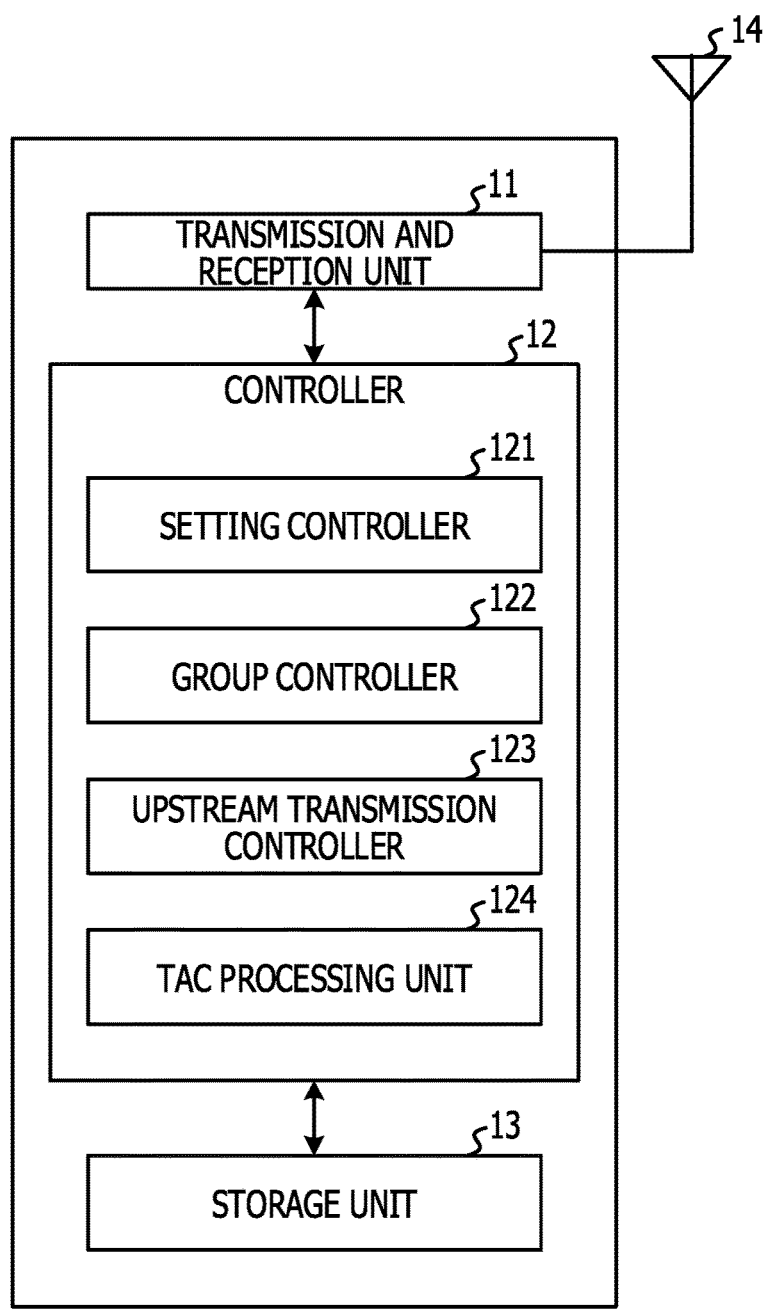
FIG. 4 is a functional block diagram depicting a mobile station of R11 in a wireless communication system.

FIG. 4 is a functional block diagram depicting the mobile station 10 of R11 in a wireless communication system.

As depicted in FIG. 4, the mobile station 10 of R11 according to the present embodiment includes a transmission and reception unit 11, a controller 12, a storage unit 13, and an antenna 14. The transmission and reception unit 11 transmits and receives a radio signal transmitted via the antenna 14.

The controller 12 includes a setting controller 121, a group controller 122, an upstream transmission controller 123, and a TAC processing unit 124. The storage unit 13 stores the TA of a TAC transmitted from a base station 20, for example.

The setting controller 121 executes an RRC connection establishment procedure. In addition, the setting controller 121 sets the radio parameters of the mobile station 10 based on the RRC connection reconfiguration information transmitted from the base station 20.

The group controller 122 controls the generation of a TAG and wireless communication by cells belonging to a TAG. In addition, the group controller 122 determines whether TAG setting information is included in RRC connection reconfiguration information transmitted from the base station 20. RRC connection reconfiguration information will be described in detail later.

The upstream transmission controller 123 controls, for each TAG, the upstream transmission timing of wireless communication by cells belonging to the TAG.

The TAC processing unit 124 processes a TAC received from the base station 20. For example, the TAC processing unit 124 obtains a TA and TAG from the received TAC. Then, the TAC processing unit 124 applies the TA obtained from the TAC to wireless communication by cells belonging to the TAG obtained from the TAC in corporation with the upstream transmission controller 123.

The functions of the controller 12 may include processors such as a CPU and DSP.

Next, TAG setting information included in RRC connection reconfiguration information will be described.

Figure 6:
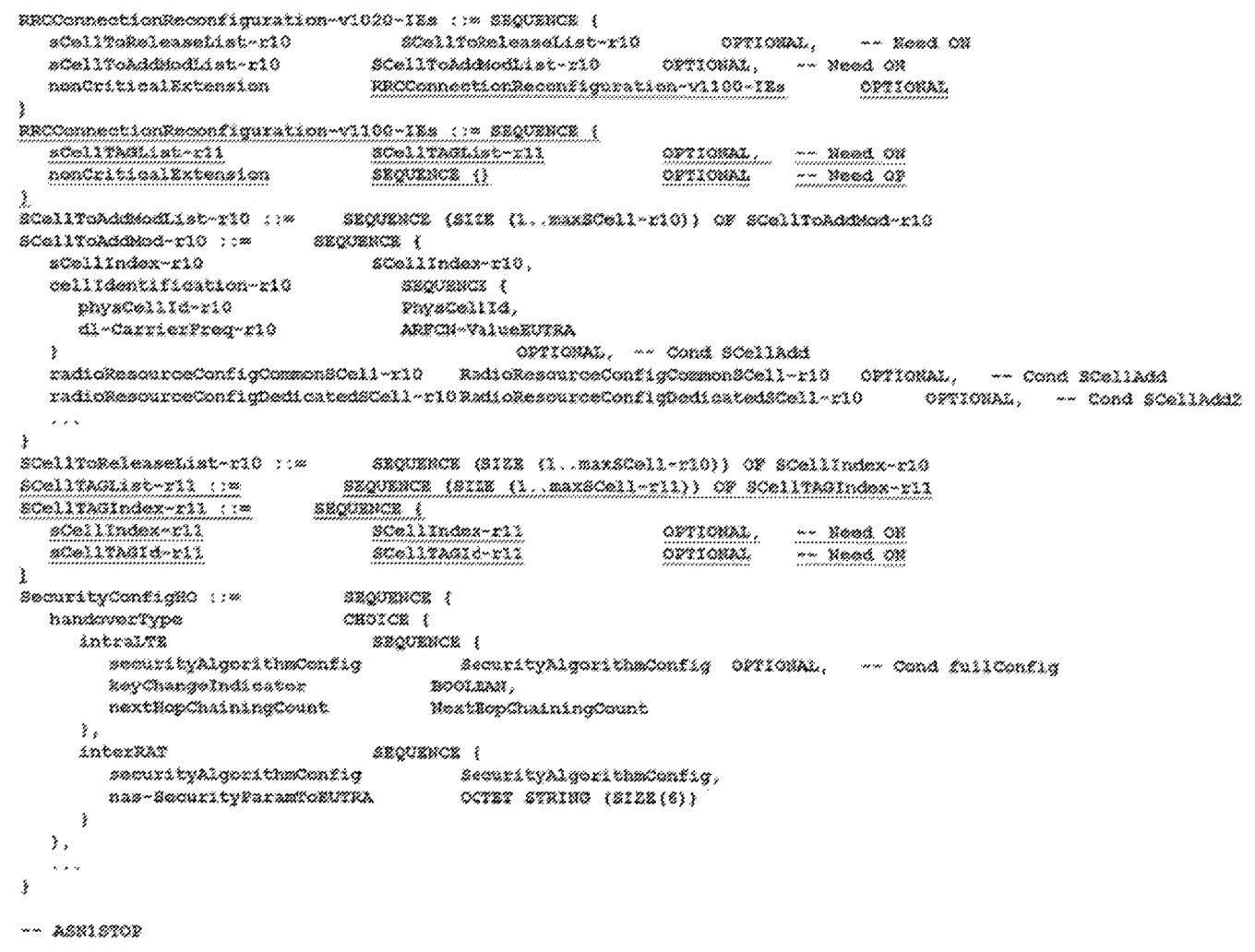

FIG. 5 depicts an example of codes of RRC connection reconfiguration information of R11 according to the present embodiment (part 1). FIG. 6 depicts an example of codes of RRC connection establishment information of R11 according to the present embodiment (part 2). Due to restrictions on the sheet size, FIG. 5 depicts the first half of the codes and FIG. 5 depicts the last half.

As depicted in FIGS. 5 and 6, the RRC connection reconfiguration information of R11 according to the present embodiment defines TAG setting information for causing the mobile station 10 to set the TAG (depicted by the underline). TAG setting information includes cell-TAG correspondence information and associates cell identification numbers with TAG identification numbers using the cell-TAG correspondence information. For example, when the cell identification number is "01" and the TAG identification number associated with the cell is "00", the base station 20 transmits "0100" as the correspondence information to the mobile station 10. The RRC connection reconfiguration information according to the present embodiment is only an example and the present disclosure is not limited to this example. TAG setting information (second information) specifies whether it is used to specify the TAG identifier of a TAC. Since the specification of a TAG identifier causes the cells belonging to the TAG to be specified as a result, TAG setting information also specifies the cells to which the TA is applied.

Next, the operation of the mobile station 10 of R11 according to the present embodiment will be described.

Figure 7:
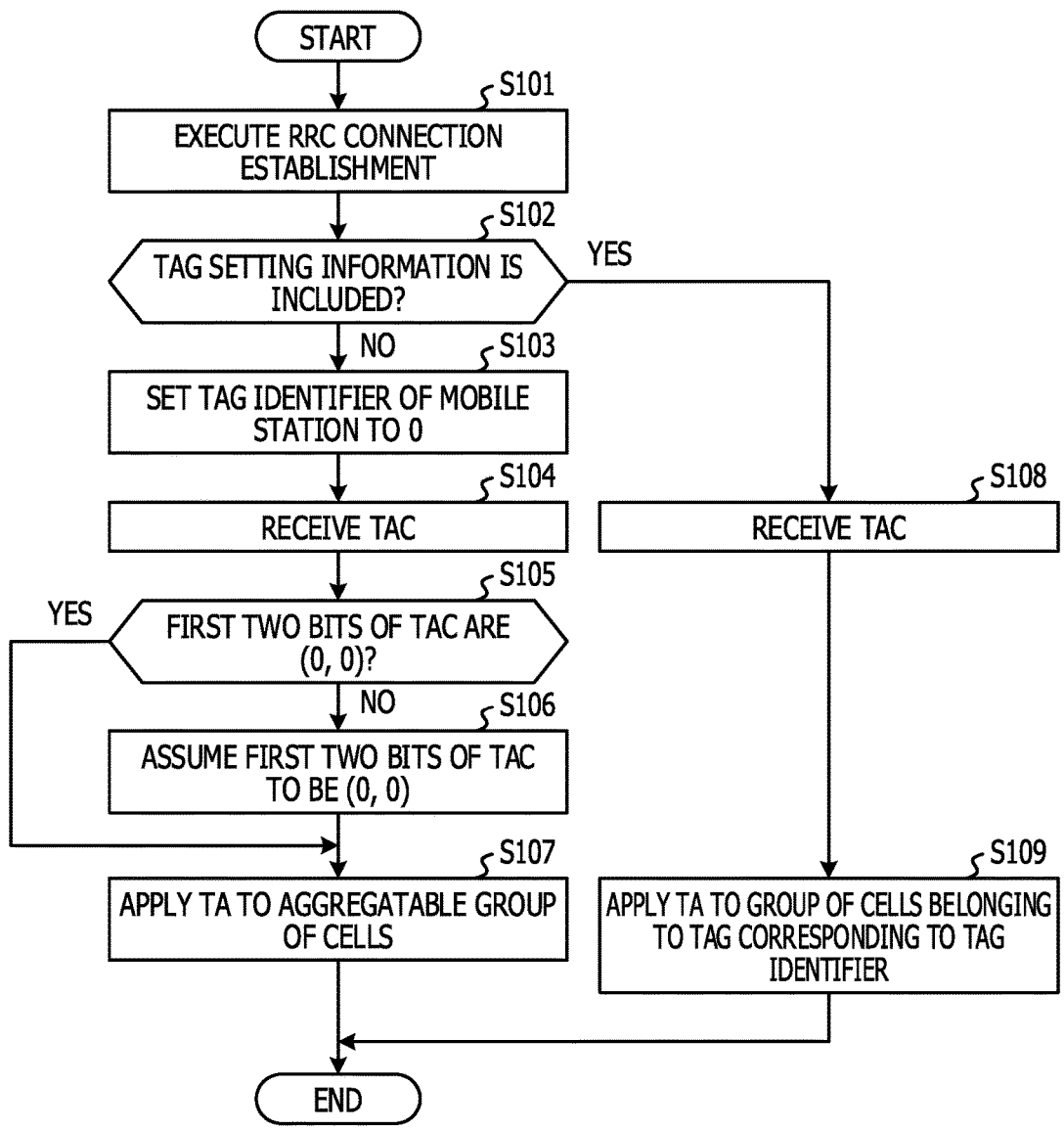
FIG. 7 is a flowchart depicting the operation of a mobile station.

FIG. 7 is a flowchart depicting the operation of a mobile station 10.

As depicted in FIG. 7, the setting controller 121 executes an RRC connection establishment procedure with the base station 20 to shift the state of RRC from the idle mode to the connected mode (step S101). At this time, the mobile station 10 stores TA (11 bits) to be received from the base station 20 in the storage unit 13. From then on, the mobile station 10 uses the TA stored in the storage unit 13 to adjust the upstream transmission timing.

Next, upon receiving RRC connection reconfiguration information from the base station 20, the transmission and reception unit 11 notifies the setting controller 121 of the RRC connection reconfiguration information. The setting controller 121 sets various radio parameters based on the RRC connection reconfiguration information. In addition, the setting controller 121 notifies the group controller 122 of the RRC connection reconfiguration information.

Next, the group controller 122 determines whether TAG setting information is included in the RRC connection reconfiguration information received from the base station 20 (step S102).

If it is determined that TAG setting information is not included (No in step S102), the connection destination of the mobile station 10 is assumed to be the base station of R10, so the group controller 122 sets all TAG identifiers of a aggregatable group of cells to 0 for its setting parameters (step S103). For example, when all cells are aggregatable, the TAG identifies of all cells are set to 0. Therefore, when a TAG identifier of 0 is assigned to pTAG as in the present embodiment, all aggregatable groups of cells belong to pTAG.

Next, upon receiving a TAC from the base station 20 (step S104), the transmission and reception unit 11 notifies the TAC processing unit 124 of the controller 12 of the TAC. Then, the TAC processing unit 124 notifies the group controller 122 of the first two bits of the TAC. The group controller 122 analyzes the first two bits of the TAC and determines whether the first two bits are (0, 0) (step S105).

If it is determined that the first two bits of the TAC are (0, 0) (No in step S105), the group controller 122 assumes the first two bits to be (0, 0) (that is, the group controller 122 assumes the TAG identifier to be 0) (step S106) and notifies the TAC processing unit 124 to apply the TA of the TAC to all cells belonging to the TAG with a TAG identifier of 0. Since a TAG identifier of 0 is assigned to all cells in the present embodiment, the group controller 122 notifies the TAC processing unit 124 to assign the TA to all aggregatable groups of cells. Then, the TAC processing unit 124 applies the TA to all aggregatable groups of cells in corporation with the upstream transmission controller 123 based on the notification from the group controller 122 (step S107).

In contrast, if it is determined that the first two bits of the TAC are (0, 0) (Yes in step S105), the group controller 122 notifies the TAC processing unit 124 to apply the TA of the TAC to all cells belonging to the TAG specified by the first two bits of the TAC. The first two bits are (0, 0) in this case, so the group controller 122 notifies the TAC processing unit 124 to apply the TA to all cells belonging to the TAG with a TAG identifier of 0 (that is, to all aggregatable group of cells). Then, the TAC processing unit 124 applies the TA to all aggregatable group of cells in corporation with the upstream transmission controller 123 based on the notification from the group controller 122 (step S107).

That is, in the present embodiment, when TAG setting information is not included in the RRC connection reconfiguration information received from the base station 20, it is determined that the connection destination of the mobile station 10 is the base station of R10 and the TA is applied to all aggregatable cells.

Next, the TAC processing unit 124 notifies the upstream transmission controller 123 to correct the TA stored in the storage unit 13 and stores it as a new TA in the storage unit 13.

In contrast, if it is determined that TAG setting information is included in the RRC connection reconfiguration information from the base station 20 (Yes in step S102), that is, when the connection destination of the mobile station 10 is the base station of R11, the transmission and reception unit 11 notifies the TAC processing unit 124 after receiving the TAC (step S108). Then, the TAC processing unit 124 notifies the group controller 122 of the first two bits of the TAC. The group controller 122 analyzes the first two bits of the TAC and notifies the TAC processing unit 124 to set the TA for the group of cells belonging to the TAG specified by the two bits. Then, the TAC processing unit 124 applies the TA to the group of cells belonging to the TAG specified by the first two bits of the TAC in corporation with the upstream transmission controller 123 based on the notification from the group controller 122 (step S109).

Accordingly, in the present embodiment, only when TAG setting information is included in RRC connection reconfiguration information received from the base station 20, it is determined that the connection destination of the mobile station 10 is the base station of R11 and the TA is applied to the group of cells belonging to the TAG specified by the first two bits of the TAC.

Next, the TAC processing unit 124 notifies the upstream transmission controller 123 to correct the TA stored in the upstream transmission controller 123 and stores it as a new TA in the storage unit 13.

In this way, the mobile station 10 is able to apply appropriate TAs to all cells regardless of the release number of the base station 20.

(Base Station 20)

Next, the functional blocks of the base station 20 according to the present embodiment will be described.

Figure 8:
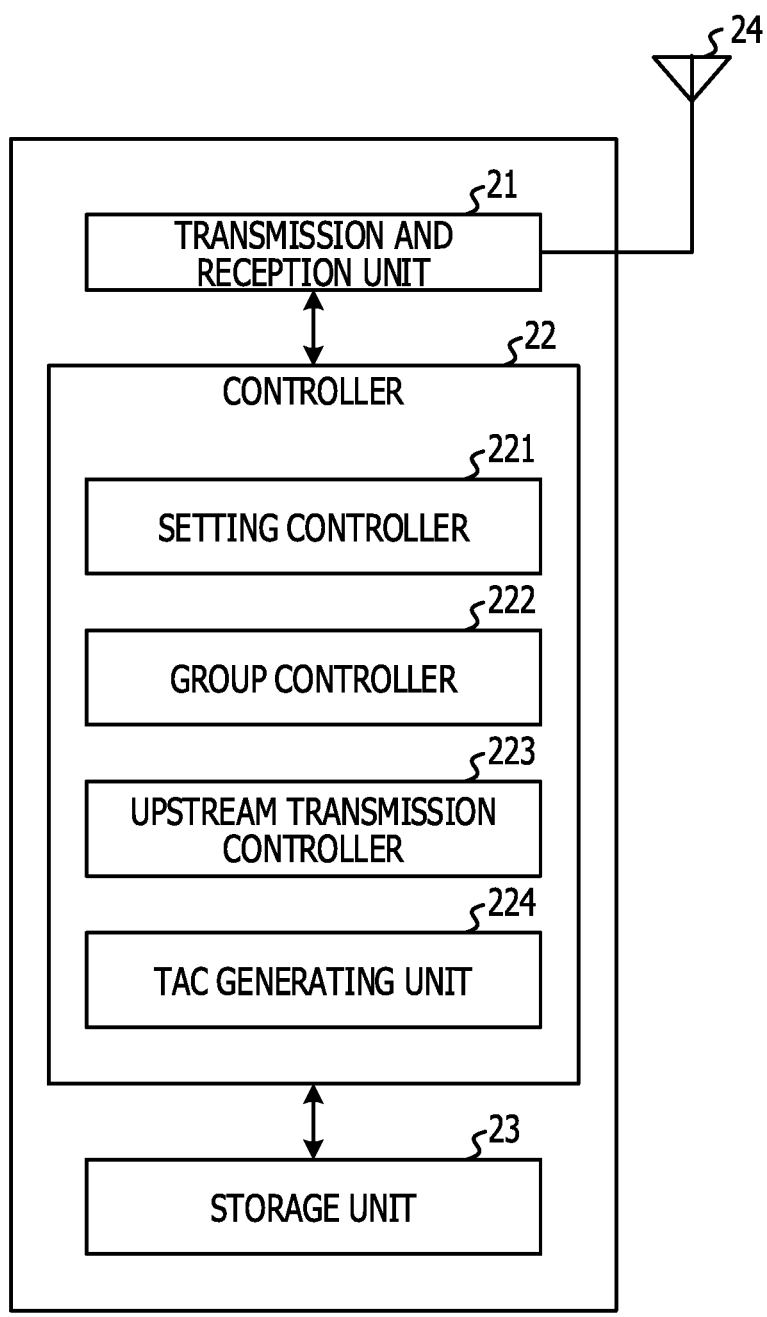
FIG. 8 depicts a functional block of a base station of R11 in a wireless communication system.

FIG. 8 depicts a functional block of a base station 20 of R11 in the wireless communication system.

As depicted in FIG. 8, the base station 20 of R11 according to the present embodiment includes a transmission and reception unit 21, a controller 22, a storage unit 23, and an antenna 24. The transmission and reception unit 21 transmits and receives a radio signal transmitted via the antenna 24.

The controller 22 includes a setting controller 221, a group controller 222, an upstream transmission controller 223, and a TAC generating unit 224. The storage unit 23 stores a TA included in a TAC and RRC connection reconfiguration information to be transmitted to the mobile station 10.

The setting controller 221 executes an RRC connection establishment procedure. In addition, the setting controller 221 instructs the transmission of RRC connection reconfiguration information to cause the mobile station 10 to set radio parameters. RRC connection reconfiguration information includes TAG setting information.

The group controller 222 controls the generation of a TAG and wireless communication by cells belonging to a TAG.

The upstream transmission controller 223 controls, for each TAG, the upstream transmission timing of wireless communication by cells belonging to the TAG. For example, the upstream transmission controller 223 calculates a TA based on radio signals received from cells belonging to each TAG.

The TAC generating unit 224 generates a TAC including a TA calculated by the upstream transmission controller 222 and a TAG generated by the group controller 222.

Next, the operation of the base station 20 of R11 according to the present embodiment will be described.

Figure 9:
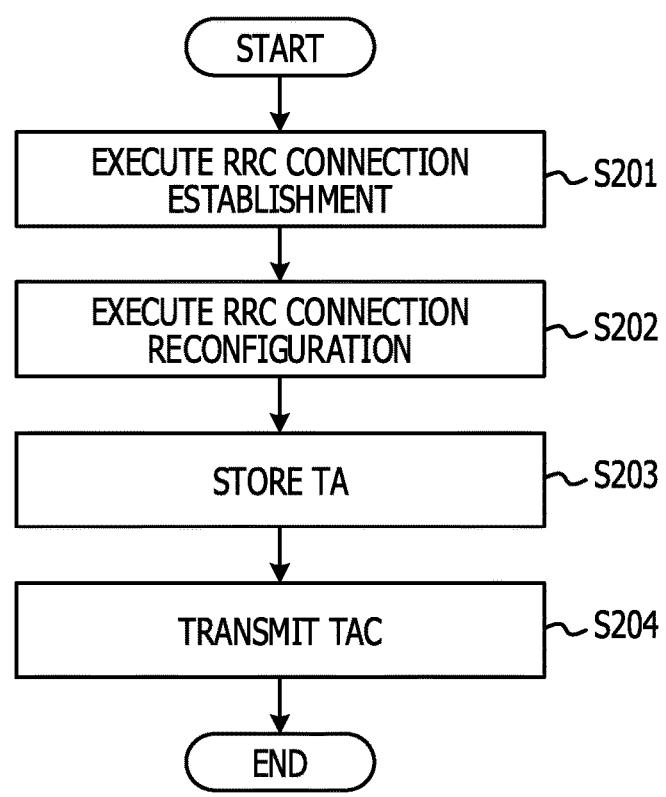
FIG. 9 is a flowchart depicting the operation of a base station.

FIG. 9 is a flowchart depicting the operation of the base station 20.

As depicted in FIG. 9, the setting controller 221 executes an RRC connection establishment procedure with the mobile station 10 to shift the state of RRC from the idle mode to the connected mode (step S201). At this time, the base station 20 stores TA (11 bits) to be transmitted to the mobile station 10 in its storage unit 23. From then on, the base station 20 uses the TA stored in the storage unit 23 to adjust the upstream transmission timing of the mobile station 10.

Next, a communication unit 21 transmits RRC connection reconfiguration information to the mobile station 10 based on an instruction from the setting controller 221 and causes the mobile station 10 to set various radio parameters (step S202). The RRC connection reconfiguration information transmitted here includes TAG setting information. Accordingly, the mobile station 10 sets TAG based on the TAG setting information included in the RRC connection reconfiguration information.

Next, when determining that the TA is desired to be corrected, the setting controller 221 notifies the upstream transmission controller 223 to correct the TA. The upstream transmission controller 223 calculates a TA based on the deviation of reception timing of a radio signal from the mobile station 10. After calculating a new TA, the upstream transmission controller 223 stores the TA in the storage unit 23 (step S203). The TA stored in the storage unit 23 is used for subsequent TA correction.

Next, the TAC generating unit 224 generates a TAC based on the TA calculated by the upstream transmission controller 223. Then, the transmission and reception unit 21 transmits the TAC generated by the TAC generating unit 224 to the mobile station 10 (step S204).

Since RRC connection reconfiguration information for setting radio parameters includes TAG setting information in the base station 20 of R11 according to the present embodiment, the mobile station 10 recognizes the base station 20 of the connection destination to be R11 based on RRC connection reconfiguration information.

Although the mobile station 10 is notified of TAG setting information through RRC connection reconfiguration information in the present embodiment, the present disclosure is not limited to this example. For example, the mobile station 10 may be notified of TAG setting information through MAC_CE (MAC control element), which is a MAC layer control signal.

FIG. 10 depicts examples of a MAC_CE format.

An example of the format in FIG. 10(*a*) includes two bytes: the first 14 bits assigned for a TAG identifier and the subsequent two bits assigned for reserved bits R. Each TAG identifier has a two-bit field. From the upper left field to the upper right field, Scell#1, Scell#2, . . . are associated in sequence, and a TAG identifier is stored in each field. For example, when Scell#1 is associated with a TAG identifier of "1", "01" is stored in the 2-bit field at the upper left. Although a TAG identifier is two bits in length in this example, the field length is not limited to this example.

In an example of the format in FIG. 10(*b*), the first two bits are assigned for reserved bits R and the subsequent 14 bits are assigned for TAG identifiers.

If SCell#1 is not set for the mobile station 10, this field may be set arbitrarily for the base station 20. In this case, the mobile station 10 may neglect this field.

Such MAC_CE is transmitted as a MAC protocol data unit (MAC_PDU) on the MAC layer.

Figure 11:
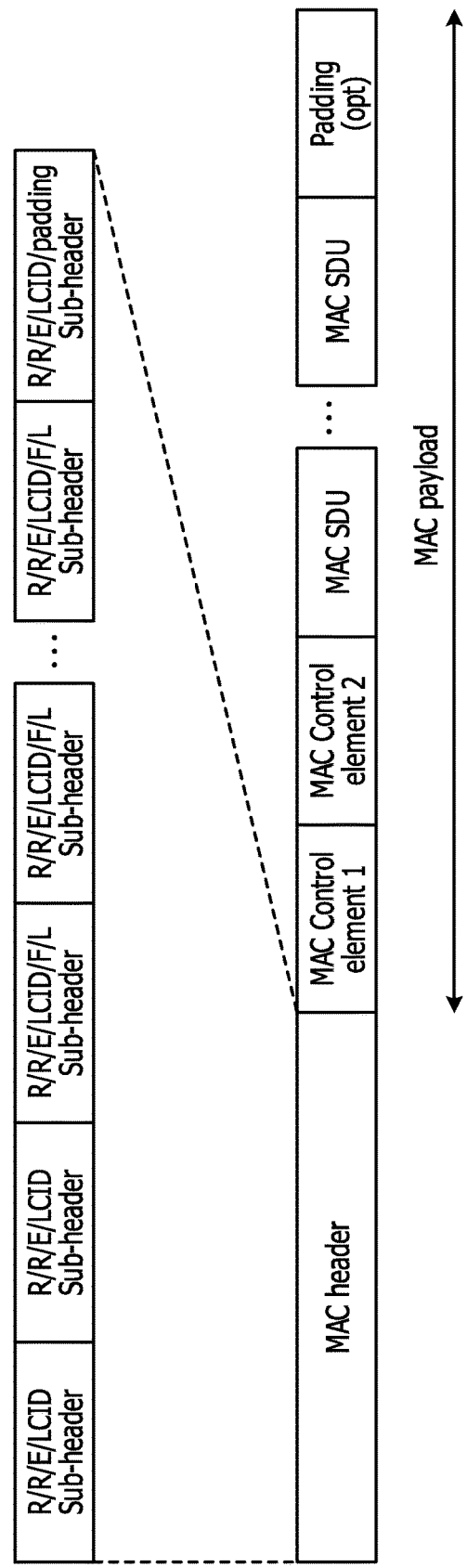
FIG. 11 depicts examples of a MAC_PDU format.

FIG. 11 depicts an example of a MAC_PDU format.

As depicted in FIG. 11, MAC_PDU includes a MAC header and a MAC playload. The MAC header stores a logical channel identifier (LCIDs) that identifies the type of MAC_CE. MAC_Payload stores MAC_CE in the position corresponding to a LCID.

Next, the procedure for performing communication between the mobile station 10 of R11 and the base station 20 of R11 will be described.

Figure 12:
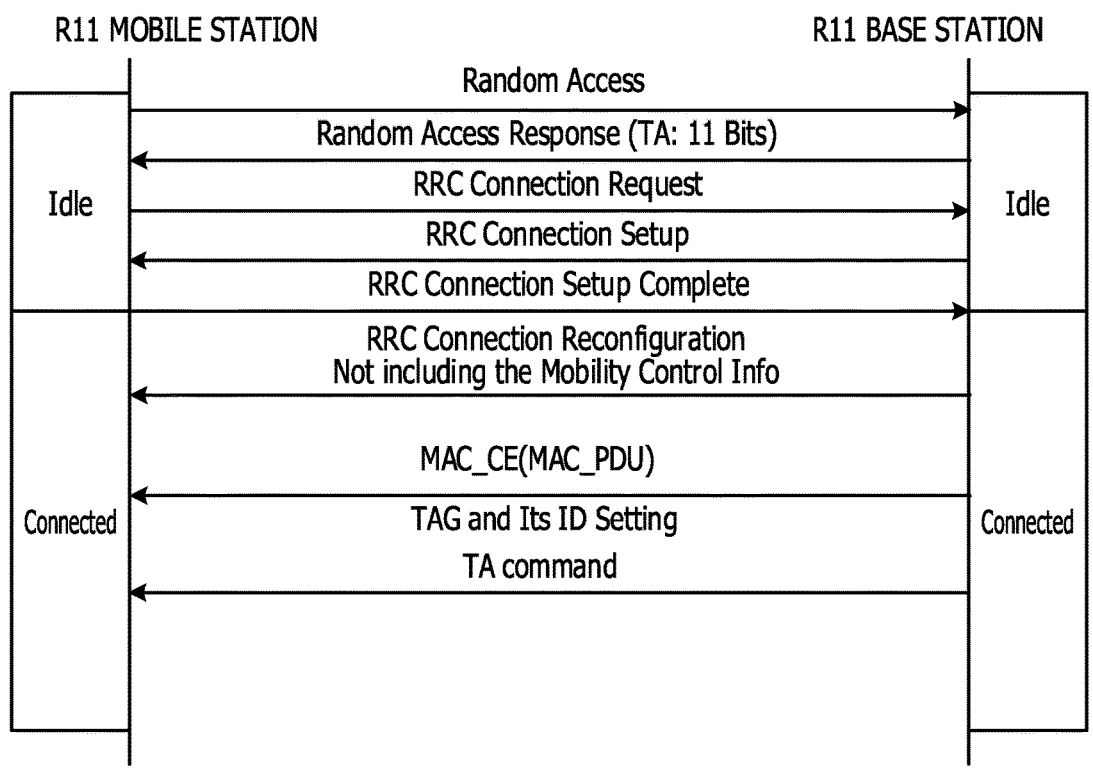
FIG. 12 depicts a sequence of connection between the mobile station of R11 and the base station of R11.

FIG. 12 depicts a sequence of connection between the mobile station 10 of R11 and the base station 20 of R11.

When the mobile station 10 is notified of TAG setting information through MAC_CE, the base station 20 transmits MAC_PDU after transmitting RRC connection reconfiguration information, as depicted in FIG. 12. However, the present disclosure is not limited to this example. For example, after the state of RRC is shifted to the connected mode, MAC_PDU may be transmitted before RRC connection reconfiguration information is transmitted.

In addition, TAG setting information may be included in notice information to be transmitted from the base station 20 to the mobile station 10, for example. The method of reporting TAG setting information is not limited to the above method.

[Embodiment 2]

Next, embodiment 2 will be described with reference to FIG. 13. However, the same components and processes as in embodiment 1 will be given the same reference numbers and descriptions are omitted.

The operation of the mobile station 10 of R11 according to the present embodiment will be described.

Figure 13:
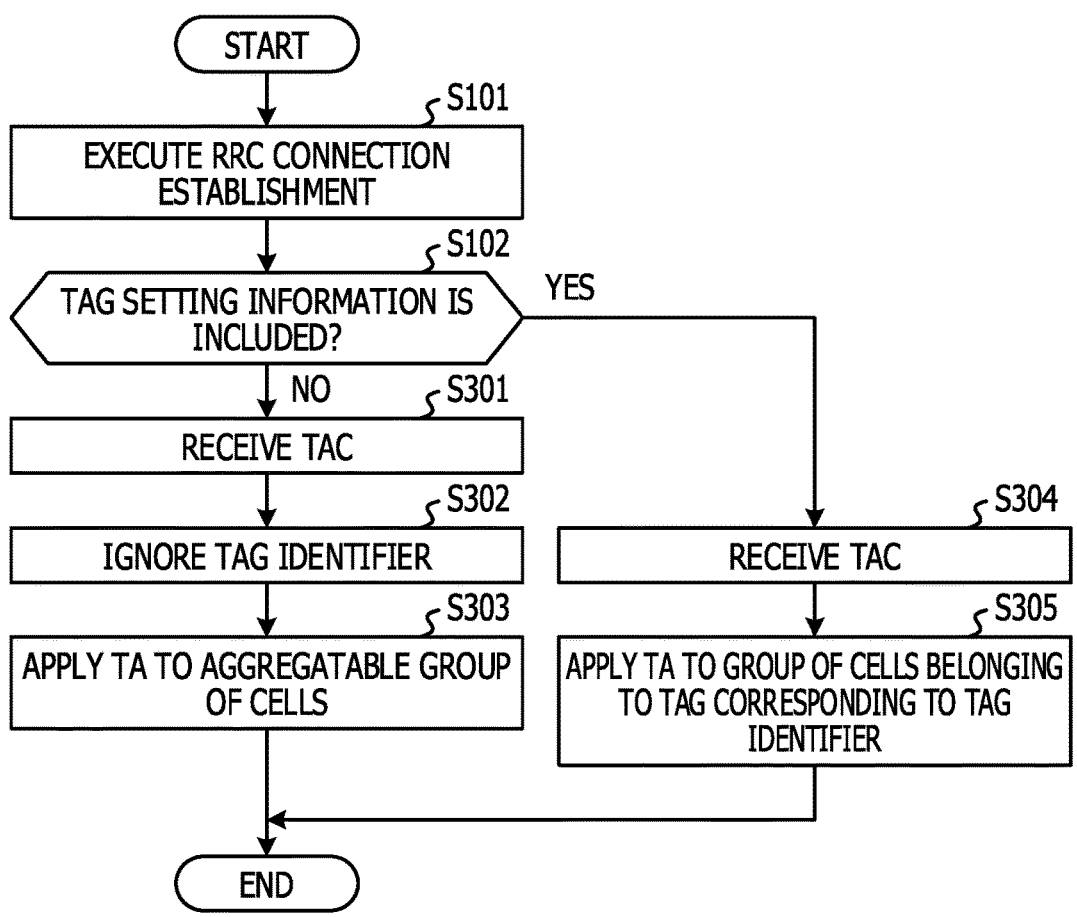
FIG. 13 is a flowchart depicting the operation of a mobile station.

FIG. 13 is a flowchart depicting the operation of the mobile station 10.

As depicted in FIG. 13, if it is determined that TAG setting information is not included in RRC connection reconfiguration information received from the base station 20 (No. in step S102), the group controller 122 neglects, after receiving a TAC (step S301), the first two bits of the TAC (step S302) and notifies the TAC processing unit 124 to aplly the TA of the TAC to all of aggregatable group of cells. Then, the TAC processing unit 124 applies the TA to all aggregatable groups of cells in corporation with the upstream transmission controller 123 based on the notification from the group controller 122 (step S303).

In contrast, if it is determined that TAG setting information is included in the RRC connection reconfiguration information (Yes in step S102), the TAC processing unit 124 notifies the group controller 122 of the first two bits of the TAC after receiving the TAC (step S304). The group controller 122 analyzes the first two bits of the TAC and notifies the TAC processing unit 124 to set the TA for the group of cells belonging to the TAG specified by the two bits. Then, the TAC processing unit 124 applies the TA to the group of cells belonging to the TAG specified by the first two bits of the TAC in corporation with the upstream transmission controller 123 based on the notification from the group controller 122 (step S305).

In this way, the mobile station 10 is able to apply appropriate TAs to all cells regardless of the Rel number of the base station 20.

In the present embodiment, when TAG setting information is not included in the RRC connection reconfiguration information received from the base station 20, it is determined that the connection destination of the mobile station 10 is the base station of R10 and the TA is applied to all of aggregatable group of cells with the first two bits of the TAC neglected. Accordingly, analysis of the first two bits of the TAC may be omitted.

[Embodiment 3]

Next, embodiment 3 will be described with reference to FIGS. 14 to 16. However, the same components and processes as in embodiment 1 will be given the same reference numbers and descriptions are omitted.

The present embodiment assumes that the connection destination of the mobile station 10 of R11 is handed over from the base station 20 of R11 to a base station 30 of R10.

First, problems that occur when the present disclosure is not applied will be described.

Figure 14:
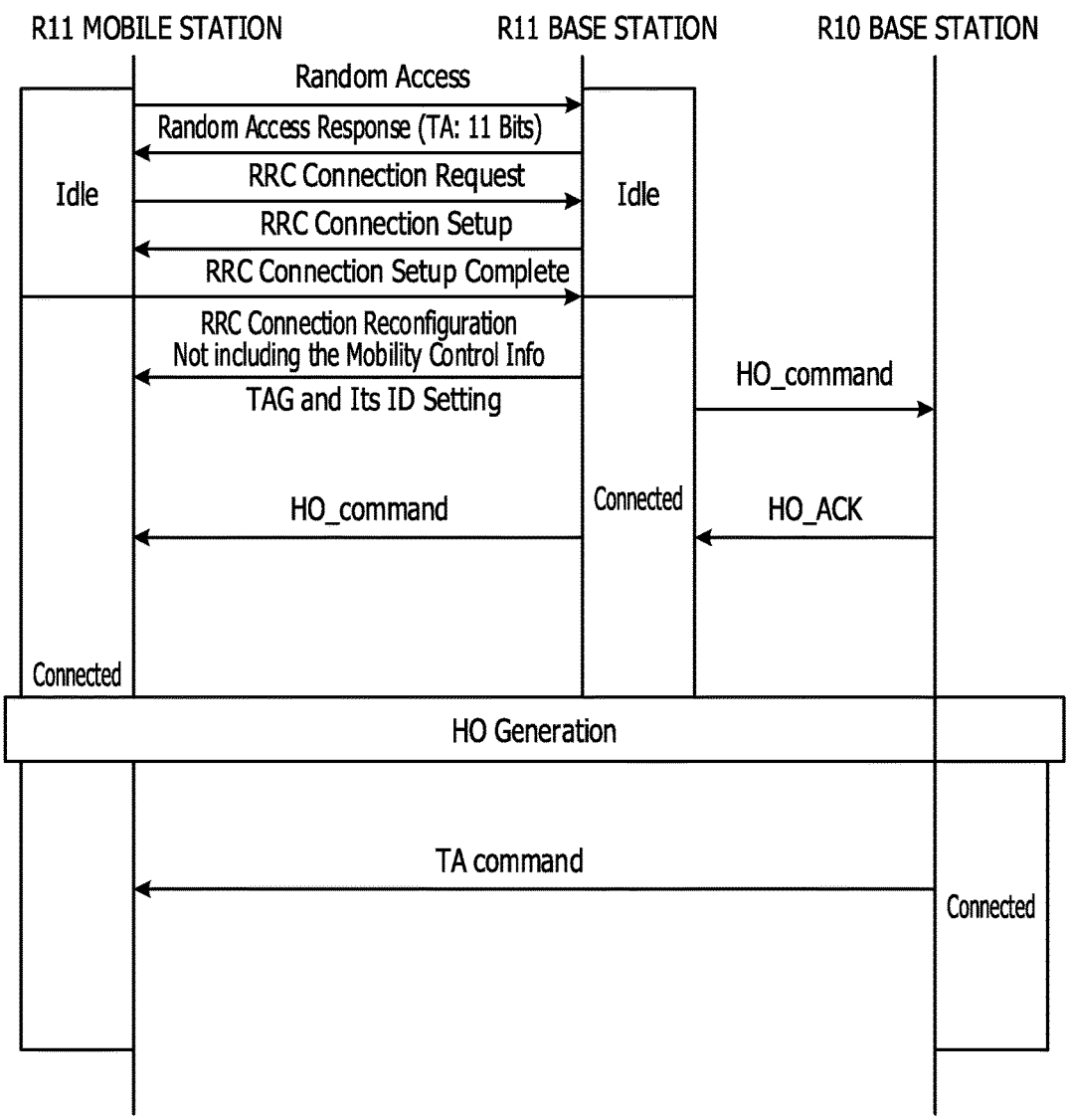
FIG. 14 depicts a sequence of handover from the base station of R11 to a base station of R10.

FIG. 14 depicts a sequence of handover from the base station 20 of R11 to the base station 30 of R10.

The base station 20 of R11, the handover source, receives a measurement report transmitted periodically from the mobile station 10. The base station 20 estimates the current radio quality based on the measurement report and performs handover if the radio quality degrades.

In handover, the base station 20, the handover source, first transmits HO_Request to the base station 30, the handover destination. To allow the handover, the base station 30, the handover destination, transmits HO_ACK to the base station 20, the handover source.

Upon receiving HO_ACK from the base station 30, the handover destination, the base station 20, the handover source, transfers RRC connection reconfiguration information included in HO_ACK to the mobile station 10 as HO_COMMAND. The RRC connection reconfiguration information transferred has been issued from the base station 30, the handover destination. Accordingly, when the base station of the handover destination is R10, HO_Command transferred to the mobile station 10 does not include TAG setting information. Therefore, a TAG reset is not performed on the mobile station 10 of R11 and the TAG setting information set before handover remains.

Accordingly, if the base station 30 of R10, the handover destination, transmits a TAC to the mobile station 10 upon completion of HO, the mobile station 10 misidentifies the first two bits (reserved bits R) of the TAC as significant and is not able to adjust the upstream transmission timing correctly.

In embodiment 3, even if handover from a mobile station of R11 to a base station of a release (for example, R10) other than R11 occurs, it is possible to process a TAC appropriately without sharing the Rel number.

Next, the operation of the mobile station 10 according to the present embodiment will be described.

Figure 15:
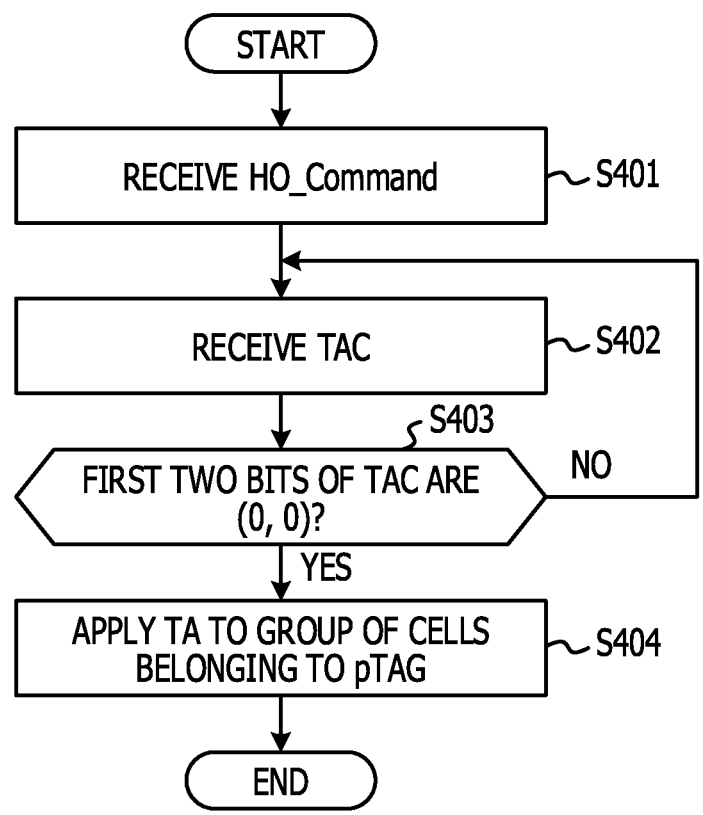
FIG. 15 is a flowchart depicting the operation of a mobile station 10.

FIG. 15 is a flowchart depicting the operation of a mobile station 10.

As depicted in FIG. 15, the transmission and reception unit 11 of the mobile station 10 receives HO_COMMAND transmitted from the base station 20 of R11 (step S401). Then, upon receiving a TAC from the base station 20 of R11 or the base station 30 of R10 (step S402), the transmission and reception unit 11 notifies the TAC processing unit 124 of the TAC. Then, the TAC processing unit 124 notifies the group controller 122 of the first two bits of the TAC. The group controller 122 analyzes the first two bits of the TAC to determine whether the first two bits are (0, 0) (step S403).

If it is determined that the first two bits of the TAC are not (0, 0) (No in step S403), reception of the TAC by the transmission and reception unit 11 is continued (step S402).

In contrast, if it is determined that the first two bits of the TAC are (0, 0) (Yes in step S403), the group controller 122 notifies the TAC processing unit 124 to apply the TA to the group of cells belonging to the TAG (that is, pTAG) with a TAG identifier of 0. Then, the TAC processing unit 124 applies the TA to the group of cells belonging to the pTAG in corporation with the upstream transmission controller 123 based on the notification from the group controller 122 (step S404).

Accordingly, if the base station 30 of R10 is configured in advance to set the first two bits of the TAC to (0, 0) (details will be described below) during occurrence of handover from the base station 20 of R11 to a base station of R10, the TA is applied to the cells belonging to the pTAG if such handover occurs. If a connection to the base station 30 of R10 is made, only the group of cells with the same transmission timing as PCell is used (that is, only the group of cells belonging to the pTAG is used). Accordingly, TA is applied to all cells that are actually used.

In addition, even if the handover destination is the base station 20 of R11 and the base station 20 sets the first two bits to (0, 0) to specify the pTAG, the TA is applied to the group of cells belonging to pTAG as intended by the base station 20.

In this way, the mobile station 10 is able to apply appropriate TAs to all cells even if handover from the base station 20 of R11 to the base station of R10 occurs.

(Base Station 30)

Next, the functional blocks of the base station 30 of R10 according to the present embodiment will be described.

Figure 16:
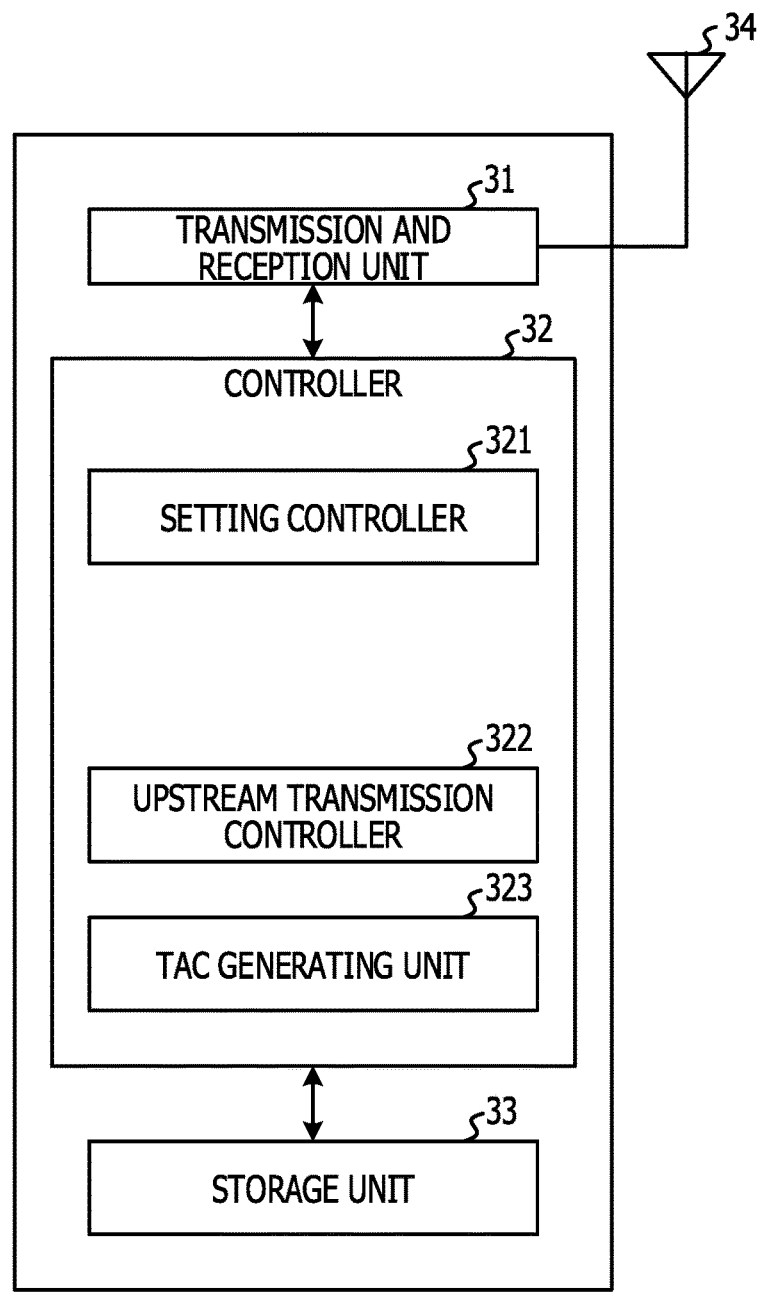
FIG. 16 depicts a functional block of the base station of R10 in the wireless communication system.

FIG. 16 depicts a functional block of the base station 30 of R10 in the wireless communication system.

As depicted in FIG. 16, the base station 30 of R10 according to the present embodiment includes a transmission and reception unit 31, a controller 32, a storage unit 33, and an antenna 34. The transmission and reception unit 31 transmits and receives a radio signal transmitted via the antenna 34.

The controller 32 includes a setting controller 321, a group controller 322, and an upstream transmission controller 323. The storage unit 33 stores a TA included in a TAC and RRC connection reconfiguration information transmitted to a mobile station 10.

The setting controller 321 executes an RRC connection establishment procedure. In addition, the setting controller 321 instructs the transmission of RRC connection reconfiguration information to cause the mobile station 10 to set radio parameters. Note that RRC connection reconfiguration information does not include TAG setting information.

The upstream transmission controller 322 controls, for each TAG, the upstream transmission timing of wireless communication by cells belonging to the TAG. For example, the upstream transmission controller 322 calculates the TA based on radio signals received from cells belonging to each TAG.

The TAC generating unit 323 generates a TAC including a TA calculated by the upstream transmission controller 322. However, the first two bits of the TAC are arbitrary set.

Next, the operation of the base station 30 of R10 according to the present embodiment will be described.

Figure 17:
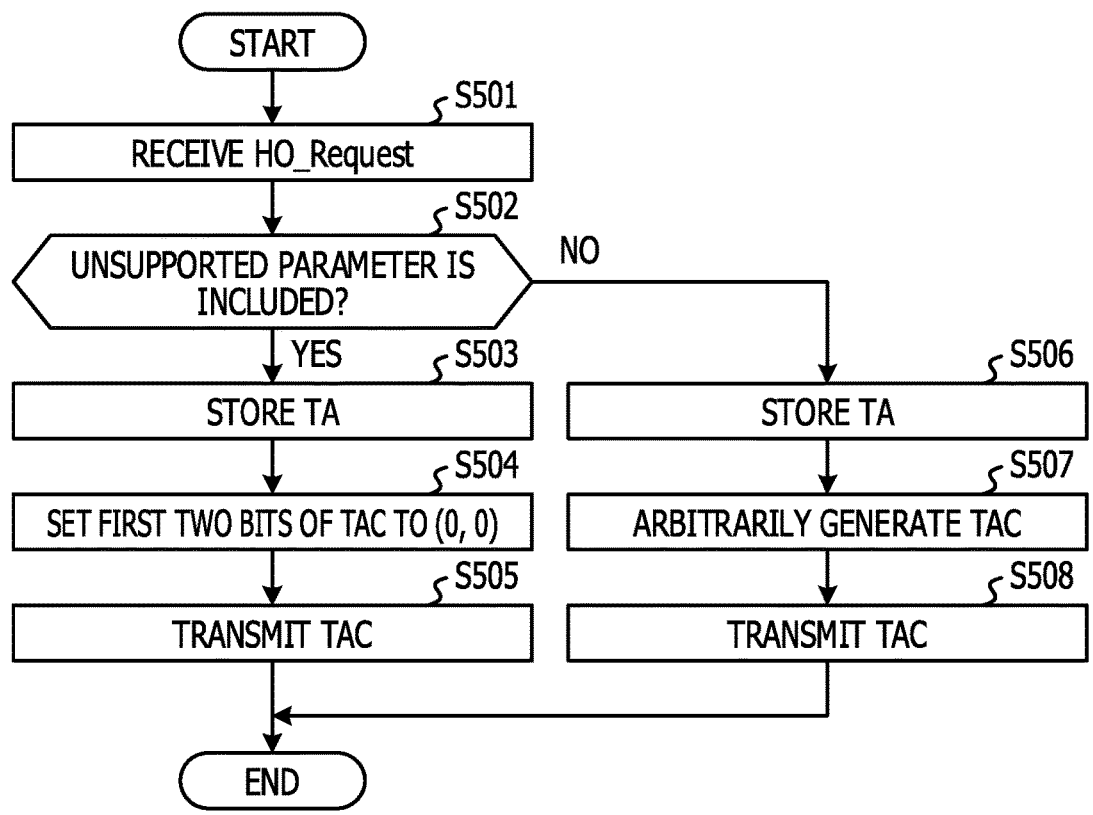
FIG. 17 is a flowchart depicting the operation of base station of R10.

FIG. 17 is a flowchart depicting the operation of base station 30 of R10.

As depicted in FIG. 17, upon receiving HO_Request (step S501) from the base station 20 of R11 (step S501), the handover source, the setting controller 321 of the base station 30 of R10 determines whether a parameter (TAG setting information) not supported by its own release is included in HO_Request (step S502).

If it is determined that a parameter not supported is included (Yes in step S502), the handover source, the base station 20 is able to determine that it is different from its own release, the setting controller 321 notifies the TAC generating unit 323 of occurrence of handover between different releases.

Next, when determining that the TA is desired to be corrected, the setting controller 321 notifies the upstream transmission controller 322 to correct the TA. The upstream transmission controller 322 calculates a TA based on the deviation of reception timing of a radio signal from the mobile station 10. After calculating a new TA, the upstream transmission controller 322 stores the TA in the storage unit 33 (step S503). The TA stored in the storage unit 33 is used for subsequent TA correction.

Next, the TAC generating unit 323 generates a TAC based on the TA calculated by the upstream transmission controller 322. At this time, the TAC generating unit 323 sets the first two bits of the TAC to (0, 0) (step S504).

Next, the transmission and reception unit 31 transmits the TAC generated by the TAC generating unit 323 to the mobile station 10 (step S505). Accordingly, upon determining that the first two bits of the TAC transmitted from the base station 30 are (0, 0) after the handover, the mobile station 10 is able to determine that handover to the base station 10 of R10 occurred or that handover to the base station 20 of R11 occurred and the base station 20 specifies a pTAG as the application destination of the TA, as described above.

In contrast, it is determined that a parameter not supported is not included (No in step S502), the setting controller 321 notifies the TAC generating unit 323 of occurrence of handover from a base station of a release other than R10 to a base station of R10.

Next, when determining that the TA is desired to be corrected, the setting controller 321 notifies the upstream transmission controller 322 to correct the TA. The upstream transmission controller 322 calculates a TA based on the deviation of reception timing of a radio signal from the mobile station 10. After calculating a new TA, the upstream transmission controller 322 stores the TA in the storage unit 33 (step S506). The TA stored in the storage unit 33 is used for subsequent TA correction.

Next, the TAC generating unit 323 generates a TAC based on the TA calculated by the upstream transmission controller 322. At this time, the TAC generating unit 323 arbitrarily sets the first two bits of the TAC (step S507).

Next, the transmission and reception unit 31 transmits the TAC generated by the TAC generating unit 323 to the mobile station 10 (step S508).

As described above, if HO_Request includes a parameter not supported by its own release, the base station 30 of R10 according to the present embodiment sets the first two bits of a TAC to be transmitted to the mobile station 10 to (0, 0) and applies the TA to the group of cells belonging to the pTAG. Accordingly, the mobile station 10 is able to apply appropriate TAs to all cells regardless of the Rel number of a handover destination.

[Embodiment 4]

Next, embodiment 4 will be described with reference to FIGS. 18 to 21. However, the same components and processes as in embodiment 1 will be given the same reference numbers and descriptions are omitted.

In embodiment 1, the mobile station 10 of R11 is assumed to connect to a base station of a release other than R11. On the other hand, in the present embodiment, the mobile station 10 of R11 is assumed to connect to the base station 20 of R11.

A system and a wireless communication method underlying the present embodiment will be described.

Figure 18:
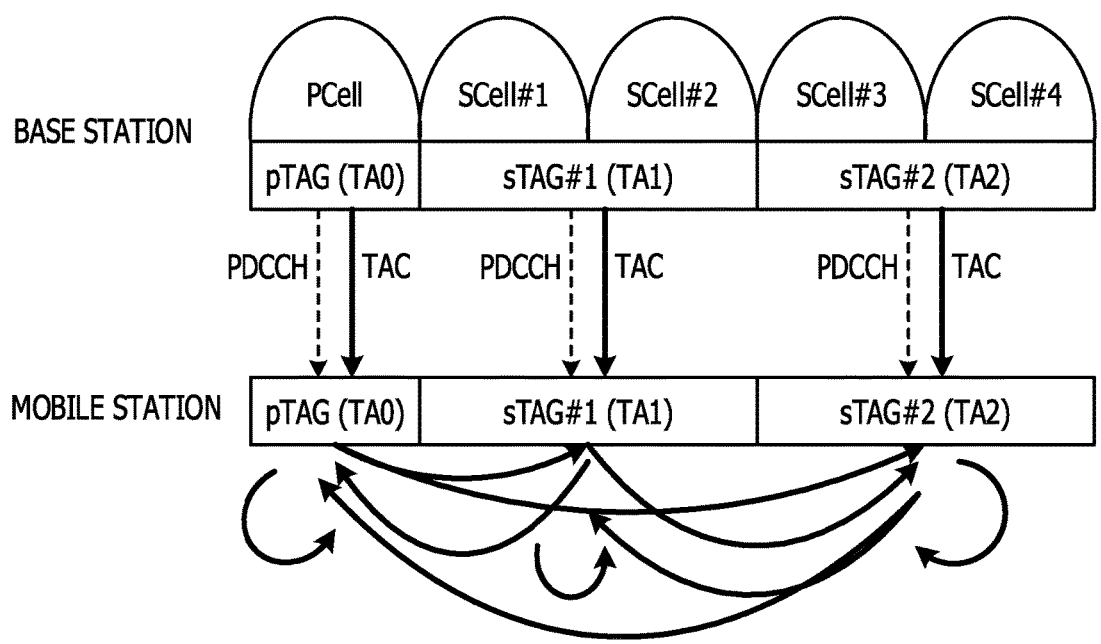
FIG. 18 schematically depicts a wireless communication method and a wireless communication system underlying an embodiment.

FIG. 18 schematically depicts a wireless communication method and a wireless communication system underlying the present embodiment.

In FIG. 18, PCell and SCell#1 to SCell#4 are aggregated. Of these cells, PCell is classified into a pTAG with a transmission timing of TA0, SCell#1 to 2 are classified into a sTAG#1 with a transmission timing of TA1, and SCell#3 to 4 are classified into a sTAG#2 with a transmission timing of TA2.

The physical downlink control channel (PDCCH) in this drawing is a control signal for the physical (PHY) layer and is used to report an arrival of the physical downlink shared channel (PDSCH), which is downstream data. The mobile station 10 recognizes the presence of data for the mobile station 10 by receiving the PDCCH. Then, the mobile station 10 identifies the radio resource to which PDSCH is transmitted and receives PDSCH by analyzing the content of the PDCCH. For example, when receiving a TAC, the mobile station 10 identifies the radio resource to which PDSCH is transmitted based on the PDCCH and recognizes the reception of the TAC by analyzing the content of PDSCH.

Next, problems with wireless communication between the mobile station 10 of R11 and the base station 20 of R11 will be described.

Upon receiving a TAC from a pTAG, the mobile station 10 applies the TAC to a Cell belonging to any of pTAG, sTAG#1, and pTAG#2. Similarly, upon receiving a TAC from sTAG#1 or pTAG#2, the mobile station 10 applies the TAC to any of pTAG, sTAG#1, and pTAG#2. The arrows in the drawing indicate this.

By the way, the active state in which the PDCCH may be received and the deactive state in which the PDCCH may not be received are defined in the SCell. Normally, the base station 20 transmits the PDCCH to the mobile station 10 when the SCELL is in the active state. However, the base station 20 may erroneously transmit the PDCCH to the mobile station 10 because the base station 20 misidentifies the SCell as being in the active state even through it is in the deactive state. This is referred to as a mismatch in the SCell state.

When the base station 20 transmits a TAC to be applied to the pTAG from a Cell belonging to the sTAG during occurrence of a mismatch in the SCell state, the mobile station 10 is not able to receive the PDCCH transmitted from the base station 20, so the mobile station 10 fails to receive the TAC. Since the transmission timing of the pTAG is not adjusted if the mobile station fails to receive the TAC, the base station 20 is not able to receive the radio signal transmitted by the mobile station 10 from the cell belonging to the the pTAG. In the worst case, a radio link failure (RLF) occurs and the state of the mobile station 10 shifts to the idle mode, possibly disabling communication.

PCell included in the pTAG is a cell used for various types of important control. For example, PCell is used for transmission of the PUCCH, transmission of ACK/NACK, which is an acknowledgment of PDSCH, and transmission of channel quality information (CQI) for reporting radio quality. PCell is also used for the setting control and resetting control of RRC connection and random access for such control. Accordingly, application of the TA of a TAC transmitted from the sTAG to the pTAG further increases the processing load of PCell, thereby affecting transmission of important control signals.

Figure 19:
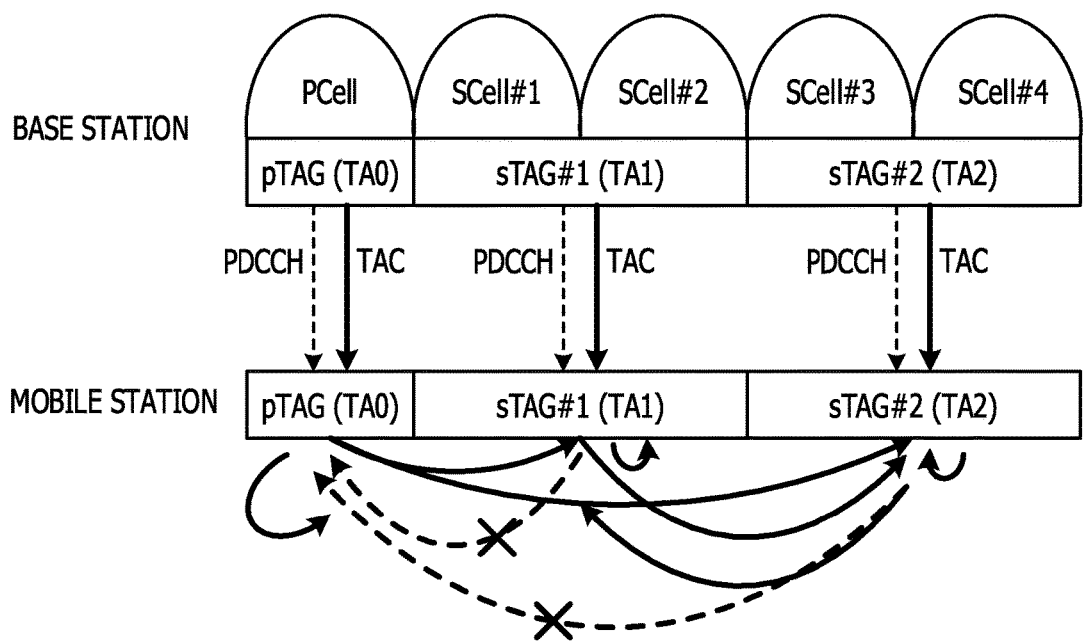
FIG. 19 depicts a case in which application of TA according to the present embodiment is prohibited.

Accordingly, in the present embodiment, when the base station 20 transmits a TAC from the sTAG, the TAC is not applied to the pTAG as depicted in FIG. 19. That is, when the TAC is applied to the pTAG, the TAC is transmitted from the pTAG. Therefore, the TAC is not applied as indicated by the dotted arrows.

(Mobile Station 10)

Next, the operation of the mobile station 10 according to the present embodiment will be described.

Figure 20:
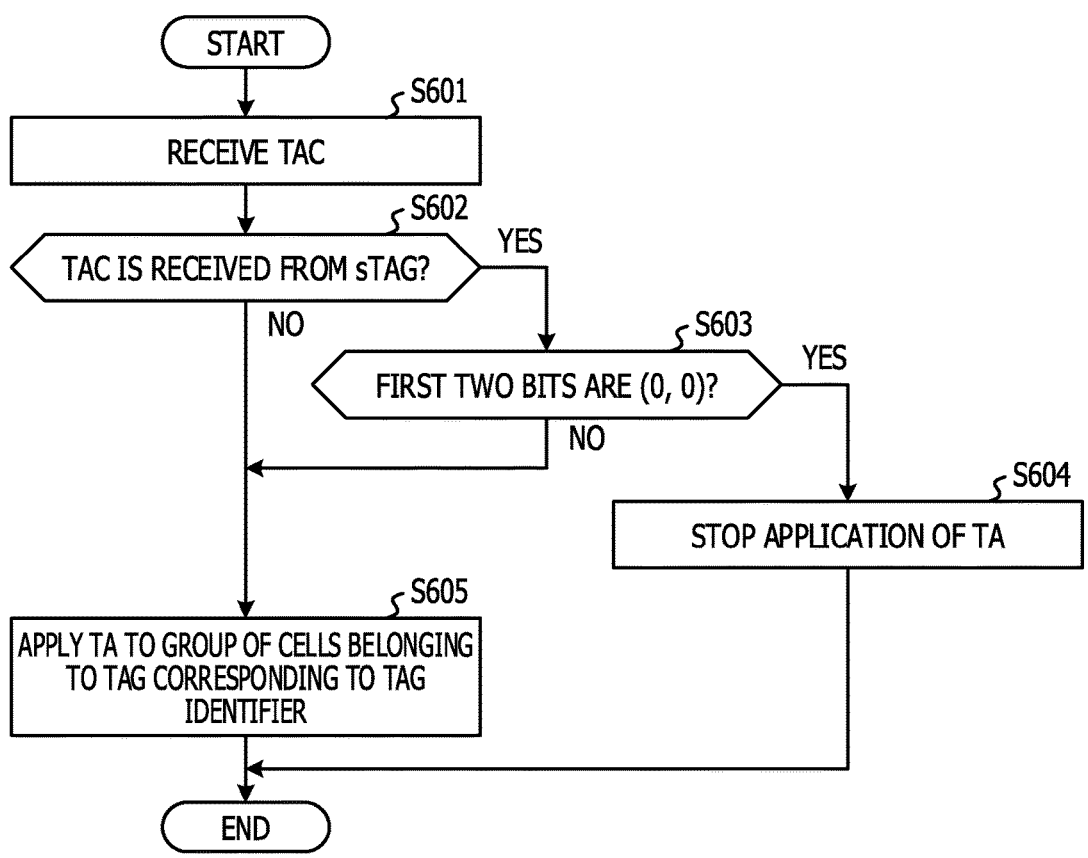
FIG. 20 is a flowchart depicting the operation of a mobile station.

FIG. 20 is a flowchart depicting the operation of the mobile station 10.

Upon receiving a TAC from the base station 20 (step S601), the transmission and reception unit 11 notifies the TAC processing unit 124 of the TAC. Then, the TAC processing unit 124 notifies the group controller 122 of the first two bits of the TAC.

Next, the group controller 122 determines whether the TAC is received from a cell belonging to the sTAG (step S602). For example, the reception cell of the TAC is only desired to be determined based on the reception cell of the PDCCH.

If it is determined that the TAC is received from a cell belonging to the sTAG (Yes in step S602), the group controller 122 further determines whether the first two bits of the TAC are (0, 0) (step S603).

If it is determined that the first two bits are (0, 0) (that is, if it is determined that the TA is applied to pTAG) (Yes in step S603), the group controller 122 notifies the TAC processing unit 124 not to apply the TA of the TAC to any cells. The TAC processing unit 124 stops application of the TAC based on the notification from the group controller 122 (step S604). At this time, the mobile station 10 may transmit NACK to the base station 20. Transmission of NACK enables the base station 20 to recognize that the TAC is unapplied and to try to transmit a TAC again. However, even if NACK is not transmitted, the base station 20 assumes that it has received NACK after a lapse of a predetermined time.

In contrast, if the first two bits of the TAC are not (0, 0) (if it is determined that the TA is applied to any one of sTAGs) (No in step S603), the group controller 122 notifies a TAC processing unit 122 to apply the TA of the TAC to the group of cells belonging to the TAG specified by the first two bits of the TAC. Then, the TAC processing unit 122 applies the TA to the group of cells belonging to the TAG specified by the first two bits of the TAC in corporation with the upstream transmission controller 123 based on the notification from the group controller 122 (step S605). Since the first two bits are not (0, 0) as described above in this case, the TA is applied to a group of cells belonging to any of sTAGs.

If it is determined that a TAC is not received from a cell belonging to an sTAG (that is, if it is determined that the TAC is received from the pTAG) (No. in step S602), the TAC processing unit 122 is notified to apply the TA to the group of cells belonging to the TAG specified by the first two bits of the TAC. Then, the TAC processing unit 122 applies the TA to the group of cells belonging to the TAG specified by the first two bits of the TAC in corporation with the upstream transmission controller 123 based on the notification from the group controller 122 (step S605). Since the TAC is received from the pTAG in this case, the TA is applied to a group (that is, PCELL) of cells belonging to the pTAG.

(Base Station 20)

The operation of the base station 20 according to the present embodiment will be described.

Figure 21:
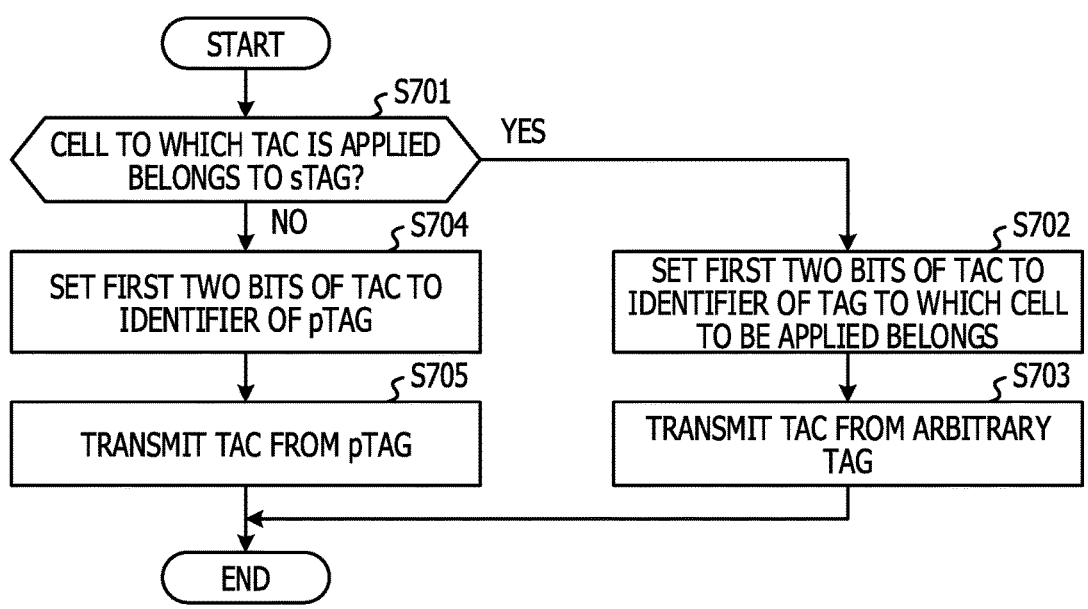
FIG. 21 is a flowchart depicting the operation of a base station.

FIG. 21 is a flowchart depicting the operation of the base station 20.

When determining that the TA is desired to be corrected, the setting controller 221 notifies the upstream transmission controller 223 to correct the TA. The upstream transmission controller 223 calculates a TA based on the deviation of reception timing of a radio signal from the mobile station 10. After calculating a new TA, the upstream transmission controller 223 associates the TA with the TAG identifier of the application destination and stores it in the storage unit 23. The TA stored in the storage unit 223 is used for subsequent TA correction.

Next, the TAC generating unit 224 generates a TAC based on the TA calculated by the upstream transmission controller 223. At this time, the TAC generating unit 224 determines whether the cell to which the TAC is applied belongs to the sTAG based on the identifier of the application destination of the TA stored in the storage unit 23 (step S701).

If it is determined that the cell to which the TAC is applied belongs to the sTAG (Yes in step S701), the TAC generating unit 224 sets the identifier of the TAG to which the cell to which the TA is applied belongs for the first two bits of the TAC (step S702).

Next, the upstream transmission controller 223 arbitrarily determines a cell used to transmit a TAC. Then, the transmission and reception unit 21 transmits the TAC generated by the TAC generating unit 224 to the mobile station 10 using the cell determined by the upstream transmission controller 223 (step S703).

In contrast, if it is determined that the cell to which the TAC is applied does not belong to the sTAG (that is, it is determined that the cell to which the TAC is applied belongs to the pTAG) (No in step S701), the TAC generating unit 224 sets (0, 0), which corresponds to the identifier "0" of the pTAG, for the first two bits of the TAC (step S704).

Next, the upstream transmission controller 223 sets the cell used to transmit the TAC for the pCell. Then, the transmission and reception unit 21 transmits the TAC generated by the TAC generating unit 224 to the mobile station 10 using the cell determined by the upstream transmission controller 223 (that is, pCell).

The above method keeps the TA of the TAC transmitted from the sTAG from being applied to the pTAG, thereby reducing the processing load of the mobile station 10.

[Embodiment 5]

Next, embodiment 5 will be described with reference to FIGS. 22 to 25. However, the same components and processes as in embodiment 4 will be given the same reference numbers and descriptions are omitted.

A system and a wireless communication method underlying the present embodiment will be described.

Figure 22:
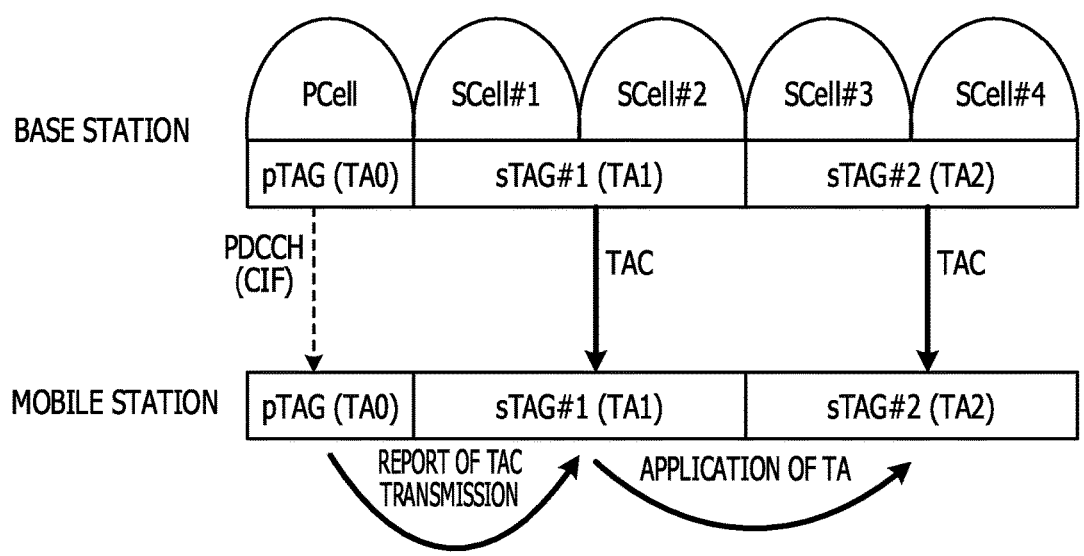
FIG. 22 schematically depicts a wireless communication method and a wireless communication system underlying the present embodiment.

FIG. 22 schematically depicts a wireless communication method and a wireless communication system underlying the present embodiment.

The difference from FIG. 18 is that the TAC is cross-carrier-scheduled by the carrier indicator field (CIF) in FIG. 22.

The PDCCH transmitted by PCell is able to include the CIF. The CIF reports the cell from which the PDSCH is received. It is possible to report the cell from which the TAC, which is a PDSCH, is transmitted, using the PDCCH including the CIF. For example, when the TAC is transmitted from a cell belonging to sTAG#1, the CIF specifies the identifier of the cell.

In such a situation, when the first two bits of the TAC indicate an sTAG other than the sTAG that received the TAC, processing for cutting across a cell twice is desired to be done until the TA is applied. Such processing increases the processing load of a mobile station.

FIG. 22 depicts a case in which the PDCCH is received from the PCell, sCell (#1 or #2) belonging to sTAG#1, and the TA is applied to sCell (#3 and #4) belonging to sTAG#2, but other cases are assumed. For example, a case is assumed in which the PDCCH is received from the sCell (#1 or #2) belonging to sTAG#1, a TAC is received from sCell (#3 or #4) belonging to sTAG#2, the TA is applied to sCell#3 and #4 belonging to sTAG#2.

Accordingly, in the present embodiment, a restriction is imposed so that a cell is not cut across twice or more.

Figure 23:
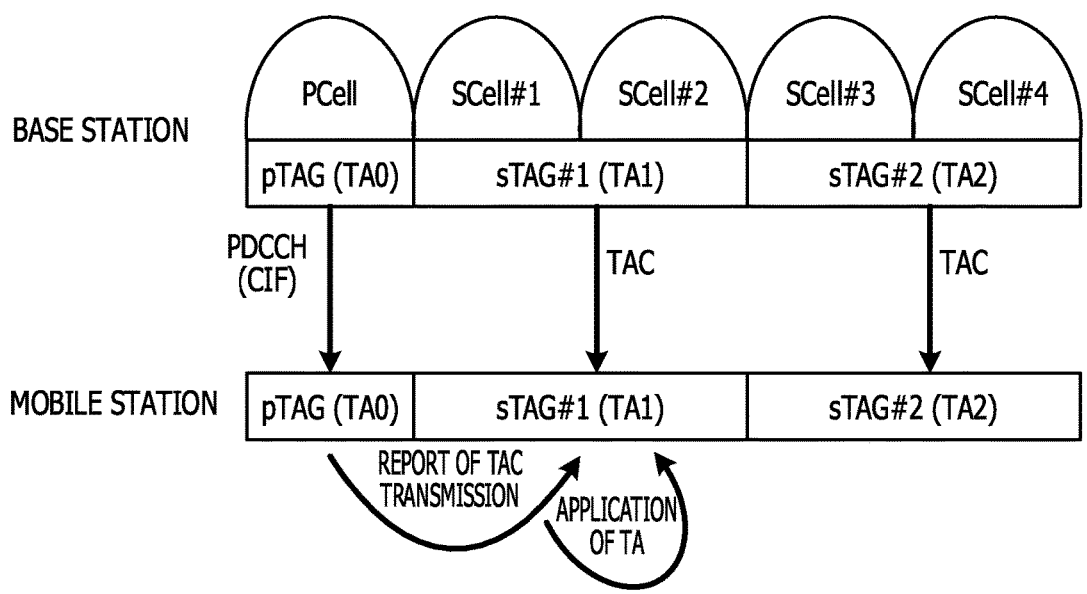
FIG. 23 depicts an example of a wireless communication method according to embodiment 2.

FIG. 23 depicts an example of a wireless communication method according to embodiment 2.

As depicted in FIG. 23, in the present embodiment, the CIF of the PDCCH transmitted from the PCell specifies sCell (#1 or #2) belonging to sTAG#1 as a transmission cell of the TAC, the first two bits of the TAC are set for the TAG identifier of sTAG#1. That is, the first two bits of the TAC are set so that sTAG to which the transmission cell of the TAC belongs and the sTAG to which the application cell of the TA belongs are common to each other.

(Mobile Station 10)

Next, the operation of the mobile station 10 according to the present embodiment will be described.

Figure 24:
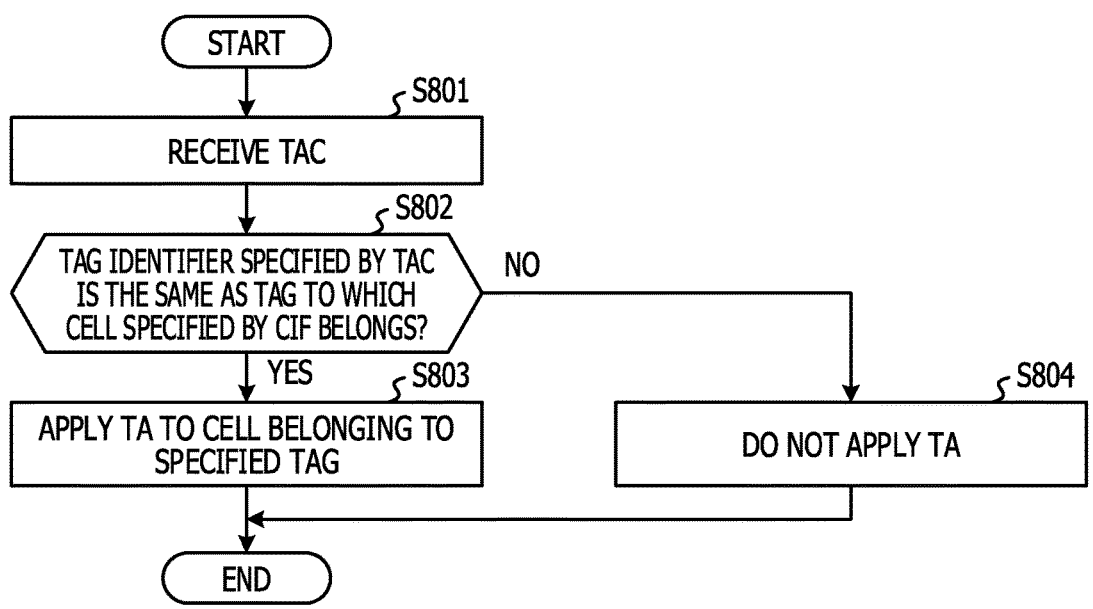
FIG. 24 is a flowchart depicting the operation of a mobile station.

FIG. 24 is a flowchart depicting the operation of the mobile station 10.

Upon receiving a TAC from the base station 20 (step 801), the transmission and reception unit 11 notifies the TAC processing unit 124 of the TAC. Then, the TAC processing unit 124 notifies the group controller 122 of the first two bits of the TAC.

Next, the group controller 122 analyzes the first two bits of the TAC to identify the TAG identifier to which the TAC is applied and determines whether the identifier is the same as that of the TAG to which the cell specified by the CIF of a previously received PDCCH belongs (step S802).

If it is determined that the identifier is the same as the identifier of the TAG to which the cell specified by the CIF belongs (Yes in step S802), the group controller 122 notifies the TAC processing unit 124 to apply the TAC to the group of cells belonging to the TAG specified by the first two bits of the TAC. The TAC processing unit 124 applies the TA to the group of cells belonging to the TAG specified by the first two bits of the TAC in corporation with the upstream transmission controller 123 based on the notification from the group controller 122 (step S803).

In contrast, if the identifier is not the same as the identifier of the TAG to which the cell specified by the CIF belongs (No in step S802), the group controller 122 notifies the TAC processing unit 124 not to apply the TAC to any cells. The TAC processing unit 124 stops application of the TAC based on the notification from the group controller 122 (step S804). At this time, the mobile station 10 may transmit NACK to the base station 20. Transmission of NACK enables the base station 20 to recognize that the TAC is unapplied and to try to transmit a TAC again. However, even if NACK is not transmitted, the base station 20 assumes that it has received NACK after a lapse of a predetermined time.

Next, the TAC processing unit 124 notifies the upstream transmission controller 123 to correct the TA stored in the upstream transmission controller 123 and stores it as a new TA in the storage unit 13.

(Base Station 20)

Next, the operation of the base station 20 according to the present embodiment will be described.

Figure 25:
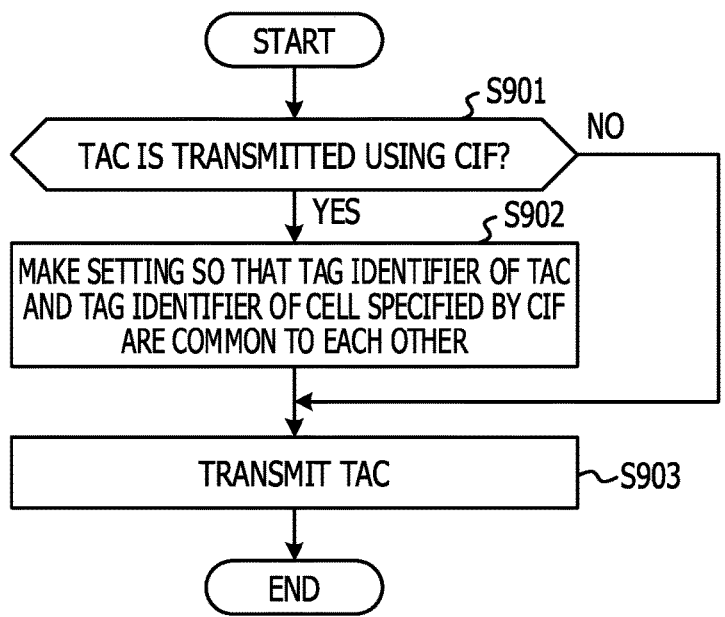
FIG. 25 is a flowchart depicting the operation of a base station.

FIG. 25 is a flowchart depicting the operation of the base station 20.

When determining that the TA is desired to be corrected, the setting controller 221 notifies the upstream transmission controller 223 to correct the TA. The upstream transmission controller 223 calculates a TA based on the reception timing of a radio signal from the mobile station 10. After calculating a new A, the upstream transmission controller 223 associates the TA with the TAG identifier of the application destination and stores it in the storage unit 23. The TA stored in the storage unit 23 is used for subsequent TA correction.

Next, the TAC generating unit 224 generates a TAC based on the TA calculated by the upstream transmission controller 223. At this time, the TAC generating unit 224 determines whether the CIF is used to transmit the TAC from the base station 20 (step S901). That is, the TAC generating unit 224 determines whether cross carrier scheduling is performed.

If it is determined that the TAC is transmitted from the CIF (Yes in step S901), the TAC generating unit 224 makes setting so that the first two bits of the TAC and the identifier of the TAG to which the cell specified by the CIF belongs are common to each other (step S902). Then, the transmission and reception unit 21 transmits the TAC generated by the TAC generating unit 224 to the mobile station 10 (step S903).

In contrast, if it is determined that the TAC is not transmitted by the CIF (No in step S901), the transmission and reception unit 21 transmits the TAC generated by the TAC generating unit 224 to the mobile station 10 (step S903).

In the above method, the TAC is applied only to the TAG to which the cell specified by the CIF belongs even if the TAC is cross-scheduled, reducing the processing load of the mobile station 10.

[Embodiment 6]

Next, embodiment 6 will be described with reference to FIGS. 26 to 28. However, the same components and processes as in the above embodiments will be given the same reference numbers and descriptions are omitted.

The present embodiment assumes a case in which a mismatch in the upstream synchronous state occurs between the mobile station 10 of R11 and the base station 20 of R11.

A system and a wireless communication method underlying the present embodiment will be described.

First, a method of determining the upstream synchronous state will be described.

Upon receiving a TAC from the base station 20, the mobile station 10 activates or restarts a TA timer (TAT) for the TAG to which the TAC is applied. The TAT is a timer that is activated only for a predetermined period. When the TAT is activated, the mobile station 10 determines that all cells belonging to the TAG corresponding to the TAT are in the upstream synchronous state. In other words, the mobile station 10 determines that the deviation of the upstream transmission timing falls within the allowable range and there is no desire to correct the TA used, as long as the TAT is activated. In contrast, if the TAT is stopped (that is, if the activation period of the TAT is completed), the mobile station 10 determines that all cells belonging to the TAG corresponding to the TAT are in the upstream asynchronous state.

However, if the TAT belonging to the pTAG is completed, the mobile station 10 assumes that the TAT belonging to the sTAG is also completed and places all cells belonging to the sTAG in the upstream asynchronous state. This is because, even when only the cell belonging to the sTAG is in the upstream synchronous state, if the PCell belonging to the pTAG enters the upstream asynchronous state, ACK or NACK is not returned in the PUCCH, thereby disabling continuation of normal communication. Accordingly, if the activation period of the TAT belonging to the pTAG is completed, the mobile station 10 places all aggregated cells in the upstream asynchronous state.

On the other hand, the base station 20 desires to recognize the upstream synchronous state of the mobile station 10. For this reason, when the mobile station 10 receives a TAC and transmits ACK for confirming the reception of the TAC to the base station 20, the base station 20 activates or restart a TAT for the TAG to which the TAC is applied upon receiving the ACK from the mobile station 10. As described above, the mobile station 10 and the base station 20 activates or restarts a TAT for the TAG to which the TAC is applied.

Figure 26:
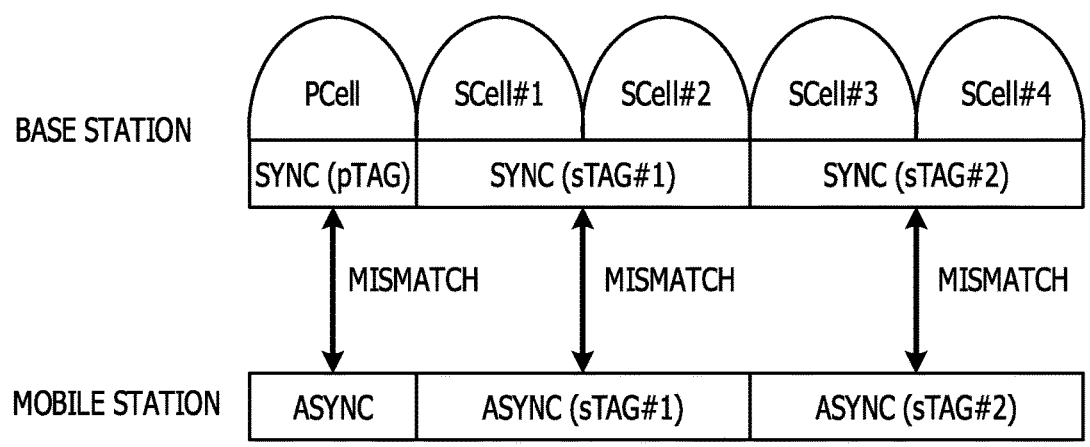
FIG. 26 depicts occurrence of a mismatch in the synchronous state between the mobile station and the base station.

FIG. 26 is a diagram depicting occurrence of a mismatch in the synchronous state between the mobile station 10 and the base station 20. The difference from FIG. 18 is that a mismatch in the upstream synchronous state occurs between the mobile station 10 and the base station 20.

A mismatch in the synchronous state occurs in the following case, for example. In the case in which the base station 20 transmits a TAC to keep the upstream synchronization of the pTAG, the mobile station 10 fails to receive the TAC and returns NACK, and the base station 20 decides the NACK as ACK (that is, in a case in which a NACK/ACK error occurs).

In this case, the mobile station 10 waits for the base station 20 to retransmit the TAC, but the base station 20 does not retransmit the TAC because it decides that the TAC has been transmitted successfully. Accordingly, if the activation period of the TAT is completed as time goes on, the pCell belonging to the pTAG enters the upstream synchronous state. In addition, the mobile station 10 assumes that the TAT of the sTAG is also completed because the TAT of the pTAG is completed, and the cells belonging to the sTAG also enters the upstream synchronous state.

However, the base station 20 recognizes that the TAC to be applied to the pTAG has been correctly received by the mobile station 10 because the base station 20 has received NACK from the mobile station 10 as ACK, and restarts the TAT for the pTAG. Accordingly, the base station 20 recognizes that the pCell belonging to the pTAG is in the upstream synchronous state. If the TAT of the sTAG is activated at this time, the cells belonging to the sTAG are also in the upstream synchronous state. In this way, a mismatch in the upstream synchronous state occurs.

Figure 27:
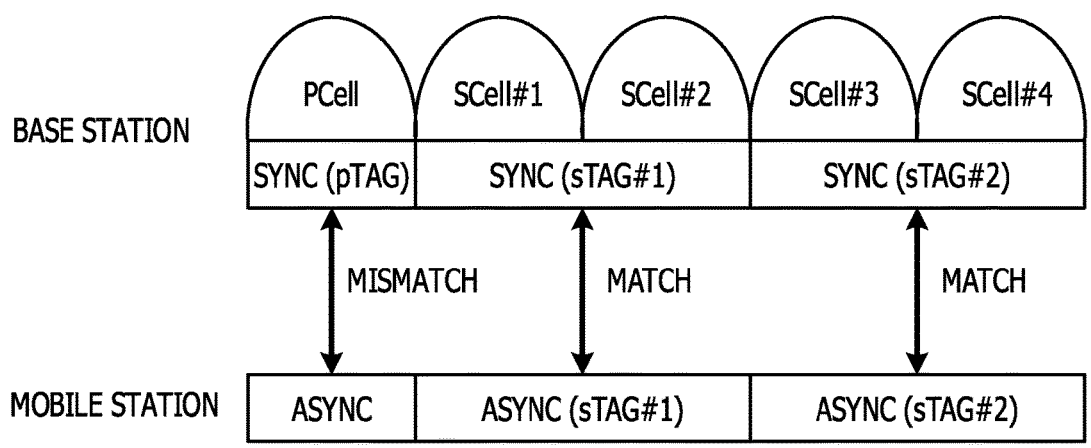
FIG. 27 depicts occurrence of a mismatch in the synchronous state between the mobile station and the base station.

FIG. 27 is another diagram depicting occurrence of a mismatch in the synchronous state between the mobile station 10 and the base station 20. The difference from FIG. 26 is that the synchronous state of the sTAG has become the upstream asynchronous state because time goes by from the state depicted in FIG. 26, matching recognition of the upstream asynchronous state between the base station 20 and the mobile station 10.

Next, problems with a technique underlying the present embodiment will be described.

For example, when the base station 20 transmits a TAC to be applied to the sTAG in FIG. 26, the mobile station 10 applies the TA (six bits) of the TAC received from the base station 20 to the sTAG, an application target. This places the cells belonging to the sTAG in the upstream synchronous state. However, the PCell is in the upstream asynchronous state, causing a state that disables normal communication.

To perform random access to the SCell with which upstream synchronization is established in FIG. 27, the base station 20 transmits Msg0 (PDCCH order), a control signal for triggering random access. The mobile station 10 performs random access based on the Msg0 from the base station 20 and receives the absolute value (11 bits) of the TA as a random access response. Then, the mobile station 10 applies the TA to the sTAG. This places the cells belonging to the sTAG in the upstream synchronous state. However, the PCell is in the upstream asynchronous state, causing a state that disables normal communication.

Accordingly, in the present embodiment, the condition under which the TAC is applied to the sTAG is to keep the upstream synchronous state of the pTAG.

Next, the operation of the mobile station 10 according to the present embodiment will be described.

Figure 28:
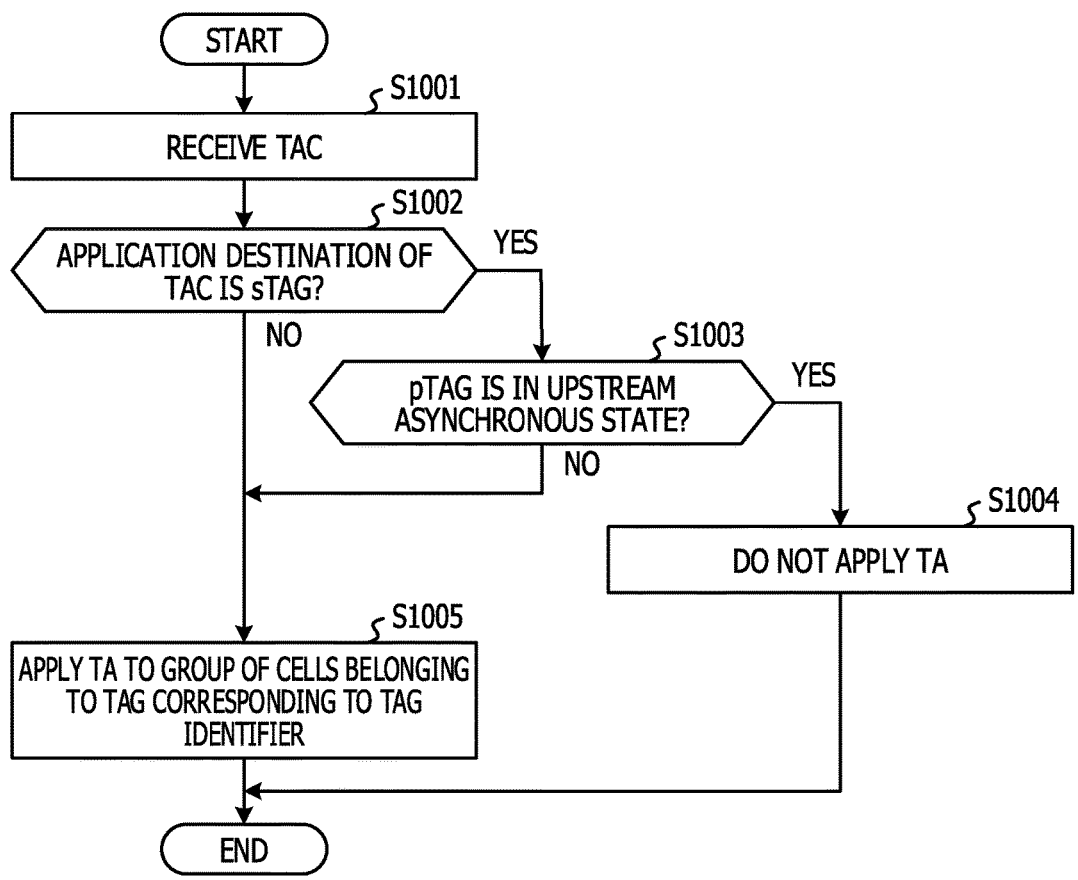
FIG. 28 is a flowchart depicting the operation of the mobile station.

FIG. 28 is a flowchart depicting the operation of the mobile station 10.

Upon receiving a TAC from the base station 20 (step S1001), the transmission and reception unit 11 notifies the TAC processing unit 124 of the TAC. Then, the TAC processing unit 124 notifies the group controller 122 of the first two bits of the TAC. The group controller 122 analyzes the first two bits to determine whether the application destination of the TAC is the sTAG (step S1002).

If it is determined that the application destination of the TAC is the sTAG (Yes in step S1002), the group controller 122 further determines whether the upstream synchronous state of the pTAG is an asynchronous state (step S1003). The upstream synchronous state of the pTAG is only desired to be stored in the storage unit 13, for example.

If it is determined that the upstream synchronous state of the pTAG is an asynchronous state (Yes in step S1003), the group controller 122 notifies the TAC processing unit 124 not to apply the TA of the TAC to any cells. The TAC processing unit 124 stops application of the TA based on the notification from the group controller 122 (step S1004). Since the pTAG is in an upstream asynchronous state at this time, the mobile station 10 is not able to transmit NACK/ACK to the base station 20. However, the base station 20 assumes that it has received NACK when a predetermined time elapses without receiving NACK/ACK after transmission of the TAC, causing no problems.

In contrast, if it is determined that the upstream synchronous state of the pTAG is not an asynchronous state (that is, if the upstream synchronous state of the pTAG is a synchronous state) (No in step S1003), the group controller 122 notifies the TAC processing unit 122 to apply the TA of the TAC to the group of cells belonging to the TAG (that is, sTAG) specified by the first two bits of the TAC. Then, the TAC processing unit 122 applies the TA to the group of cells belonging to the TAG (that is, sTAG) specified by the first two bits of the TAC in corporation with the upstream transmission controller 123 based on the notification from the group controller 122 (step S1005).

If it is determined that the application destination of the TAC is not sTAG (that is, the application destination of the TAC is the pTAG) (No in step S1002), the group controller 122 notifies the TAC processing unit 122 to apply the TA of the TAC to the group of cells belonging to the TAG (that is, pTAG) specified by the first two bits of the TAC. Then, the TAC processing unit 122 applies the TA to the group of cells belonging to the TAG (that is, pTAG) specified by the first two bits of the TAC in corporation with the upstream transmission controller 123 based on the notification from the group controller 122 (step S1005).

In the present embodiment, when the application destination of a TAC is the sTAG and the upstream synchronous state of the pTAG is an asynchronous state, application of a TA is prohibited. A method of prohibiting the application of a TA will described below.

For example, in one method, it is determined in the physical layer that a TAC transmitted as a PDSCH has been received successfully and a TAC transmitted as a PDSCH is ignored in the MAC layer. In another method, it is determined in the physical layer that a TAC transmitted as a PDSCH has been received unsuccessfully and the TAC is not passed to the MAC layer. In yet another method, a PDSCH is not received. As a solution for FIG. 27, the mobile station 10 may not execute a random access procedure (that is, not transmit a random access identifier) in response to reception of Msg0.

In the present embodiment, if the upstream of a pTAG is asynchronous, the upstream of an sTAG does not enter a synchronous state, thereby avoiding a situation that disables normal communication.

The format of a TAC is not limited to that described above. For example, the format depicted in FIG. 29 may be used. The TAC of this format is defined by a MAC control element (MAC_CE), which is a control signal for the media access control (MAC) layer. A number other than "11101" is assigned as an LCID.

Figure 29A:
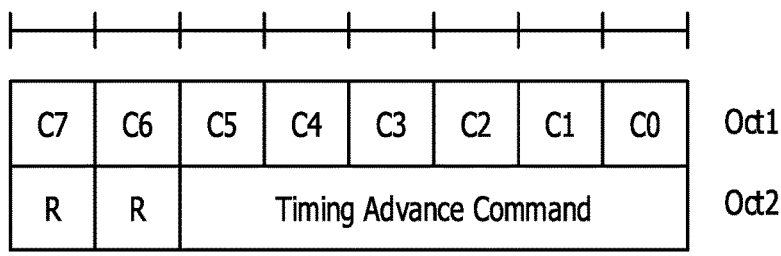
FIGS. 29A-29C depicts other examples of the format of a TAC.
Figure 29B:
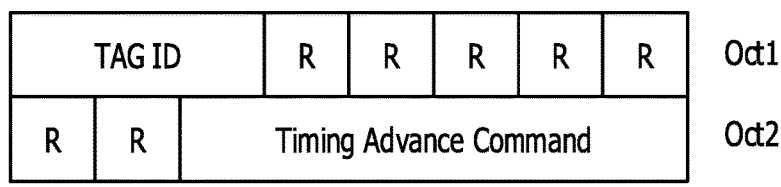
Figure 29C:
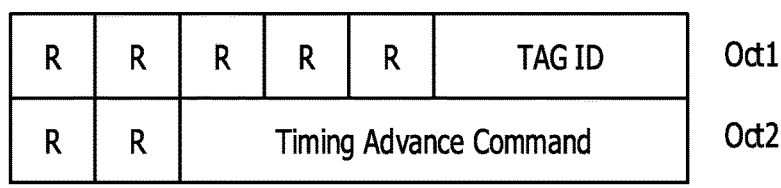

In the format in FIG. 29(*a*), the first byte defines identifier C0 of a PCell and identifiers C1 to C7 of SCells. "R" represents a reserved bit.

For example, it is assumed that the relationship between Cells and TAGs is as depicted in FIG. 18. To apply the TAC to the pTAG, the field of C0 corresponding to the pTAG is set to 1. To apply the TAC to the sTAG#1, the fields of C1 and C2 are set to 1. To apply the TAC to the sTAG#2, the fields of C3 and C4 are set to 1.

In the format in FIG. 29(*b*), a TAG identifier is represented by three bits. "R" represents a reserved bit. For example, it is assumed that the relationship between Cells and TAGs is as depicted in FIG. 18. To apply the TAC to the pTAG, the three bits of a TAG identifier are set to (0 0 0). To apply the TAC to the sTAG#1, the three bits of a TAG identifier are set to (0 0 1). To apply the TAC to the sTAG#2, the three bits of a TAG identifier are set to (0 1 0).

The placement of TAG identifiers in the format in FIG. 29(*c*) is different from that in FIG. 29(*b*). As depicted in the drawing, the placement of a TAG identifier is not limited particularly.

(Hardware Structure)

The hardware structures of the mobile station 10 and the base stations 20 and 30 according to the above embodiments will be described below.

Figure 30:
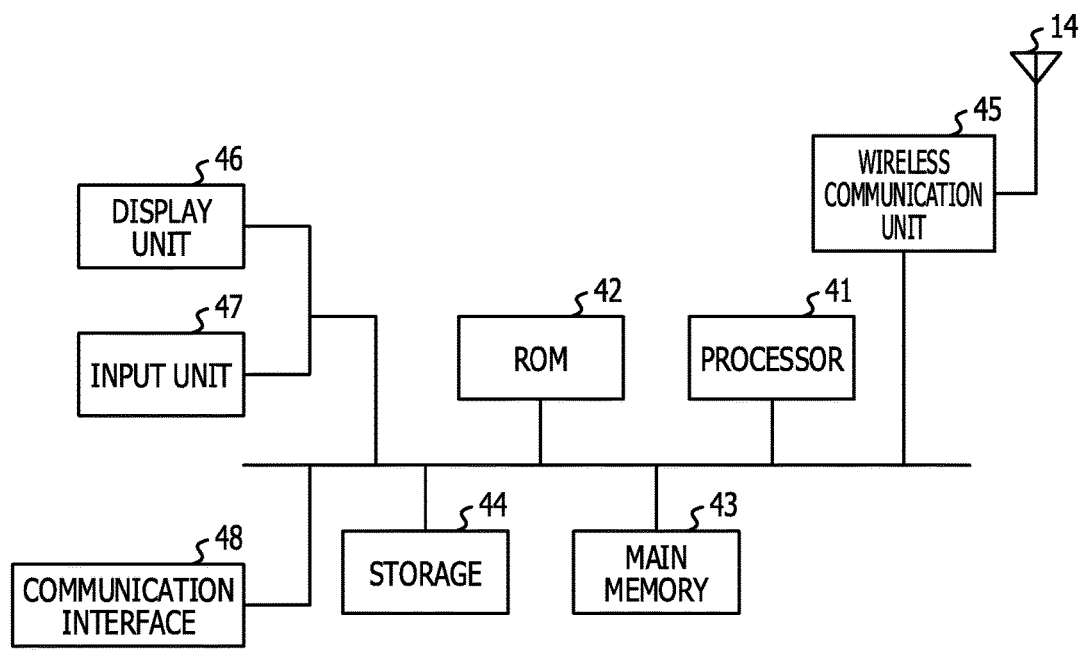
FIG. 30 depicts the hardware structure of the mobile station.

FIG. 30 depicts the hardware structure of the mobile station 10.

As depicted in FIG. 30, the mobile station 10 includes a processor 41, a ROM 42, a main memory 43, a storage 44, a wireless communication unit 45, a display unit 46, an input unit 47, and a communication interface 48, and the antenna 14.

The ROM 42, the main memory 43, the storage 44, the wireless communication unit 45, the display unit 46, the input unit 47, and the communication interface 48 are each connected to the processor 41 via a bus.

The storage 44 stores a communication program for executing the processes described in the embodiments. The processor 41 reads and loads the communication program stored in the storage 44 into the main memory 43 and executes the communication program loaded in the main memory 43 to achieve the processes of the mobile station 10 described in the embodiments. Either the storage 44 or the main memory 43 is used as the storage unit 13 described in the embodiments.

The display unit 46 is a liquid crystal screen or the like, for example. The input unit 47 is a keypad or the like, for example. The operator of the mobile station 10 inputs a phone number and so on using the display unit 46 and the input unit 47.

The communication interface 48 is a speaker, microphone, and so on, for example. The operator of the mobile station 10 performs operations such as transmission and reception of voice using the communication interface 48. The antenna 14 is connected to the wireless communication unit 45.

Figure 31:
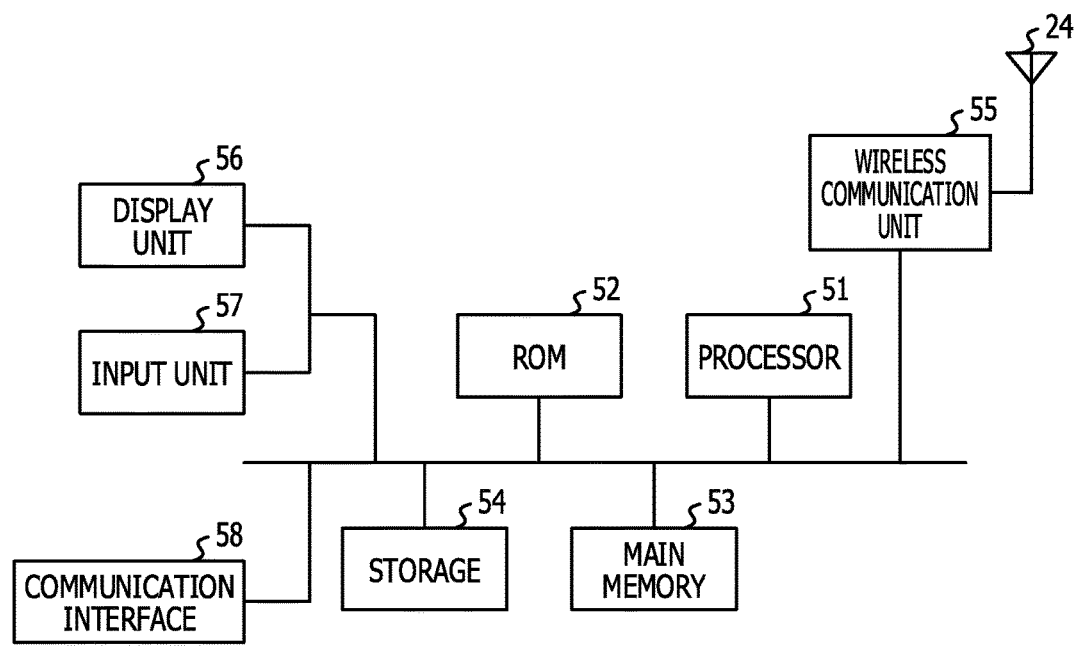
FIG. 31 depicts the hardware structure of the base stations.

FIG. 31 depicts the hardware structure of the base stations 20 and 30.

As depicted in FIG. 31, the base stations 20 and 30 both have the same structure including a processor 51, a ROM 52, a main memory 53, a storage 54, a wireless communication unit 55, a display unit 56, an input unit 57, a communication interface 58, and the antenna 24.

The ROM 52, the main memory 53, the storage 54, the wireless communication unit 55, the display unit 56, the input unit 57, and communication interface 58 are each connected to the processor 51 via a bus.

The display unit 56 is a monitor or the like, for example. The input unit 57 is a keyboard or the like, for example. The operator of the base station 20 inputs a setting program and so on for the base station 20 using the display unit 56 and the input unit 57.

The communication interface 58 communicates with an upstream station, for example. Specifically, the communication interface 58 is a network board, an analog/digital converter (ADC), and so on. The antenna 24 is connected to the wireless communication unit 55.

The storage 54 is a storage device such as, for example, a hard disk drive. The storage 54 stores a communication program for executing processes described in the embodiments. The processor 51 reads and loads the communication program stored in the storage 54 into the main memory 53 and executes the communication program loaded in the main memory 53 to achieve the processes of the base station 20 described in the embodiments. Either the storage 54 or the main memory 53 is used as the storage unit 23 described in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station for wireless communication with a mobile station using a plurality of cells configured to be grouped so as to comprise a plurality of groups of cells, the base station comprising:
    wireless communication circuitry configured to
        transmit a first control signal that includes a first field and a second field, the first field comprising first information indicating an amount of adjustment for the mobile station to use to adjust a transmission timing of the mobile station with one or more cells, and the second field being configured to store second information identifying the one or more cells among the plurality of groups of cells, and
        transmit a second control signal that includes a third field configured to include a unique identifier of one or more of the plurality of cells, according to which the second information set in the second field of the first control signal is applied to the mobile station; and
    a controller configured to perform control for transmission of the first control signal and the second control signal,
    wherein the first control signal is a Timing Advanced Command (TAC), and
    wherein the second control signal is a Radio Resource Control (RRC) message.

2. A mobile station for wireless communication using a plurality of cells configured to be grouped so as to comprise a plurality of groups of cells, the mobile station comprising:
    wireless communication circuitry configured to
        receive a first control signal transmitted from a base station, the first control signal including a first field and a second field, the first field comprising first information indicating an amount of adjustment for the mobile station to use to adjust a transmission timing of the mobile station with one or more cells, and the second field being configured to store second information identifying the one or more cells among the plurality of groups of cells, and
        receive a second control signal that includes a third field configured to include a unique identifier of one or more of the plurality of cells, according to which the second information set in the second field of the first control signal is applied to the mobile station; and
    a controller configured to, when the unique identifier is included in the second control signal, adjust, using the first information, the transmission timing of the mobile station with the group of cells specified by the second information,
    wherein the first control signal is a Timing Advanced Command (TAC), and
    wherein the second control signal is a Radio Resource Control (RRC) message.

3. The mobile station according to claim 2, wherein when the unique identifier extracted from the second control signal is null, the controller is configured to ignore the second field of the first control signal.

4. The mobile station according to claim 2, wherein when the unique identifier extracted from the second control signal is null, the controller is configured to adjust, using the first information included in the first control signal, the transmission timing of the mobile station with all of the plurality of groups of cells.

5. A wireless communication system for wireless communication using a plurality of cells configured to be grouped so as to comprise a plurality of groups of cells, the wireless communication system comprising:
    a base station configured to
        transmit a first control signal that includes a first field and a second field, the first field comprising first information indicating an amount of adjustment for the mobile station to use to adjust a transmission timing of the mobile station with one or more cells, and the second field being configured to store second information identifying the one or more cells among the plurality of groups of cells, and
        transmit a second control signal that includes a third field configured to include a unique identifier of one or more of the plurality of cells, according to which the second information set in the second field of the first control signal is applied to the mobile station; and
    a mobile station configured to
        receive the first control signal and the second control signal, and
        when the unique identifier is included in the second control signal, adjust, using the first information, the transmission timing of the mobile station with the group of cells specified by the second information,
    wherein the first control signal is a Timing Advanced Command (TAC), and wherein the second control signal is a Radio Resource Control (RRC) message.

6. The wireless communication system according to claim 5,
wherein when the unique identifier extracted from the second control signal is null, the controller is configured to ignore the second field of the first control signal.

7. The wireless communication system according to claim 5,
wherein when the unique identifier extracted from the second control signal is null, the controller is configured to adjust, using the first information included in the first control signal, the transmission timing of the mobile station with all of the plurality of groups of cells.

8. A wireless communication method comprising:
receiving, from a base station configured to use wireless communication with a mobile station by using a plurality of cells configured to be grouped so as to comprise a plurality of groups of cells, a first control signal that includes a first field and a second field, the first field comprising first information indicating an amount of adjustment for the mobile station to use to adjust a transmission timing of the mobile station with one or more cells, and the second field being configured to store second information identifying the one or more cells among the plurality of groups of cells;
receiving, from the base station, a second control signal that includes a third field configured to include a unique identifier of one or more of the plurality of cells, according to which the second information set in the second field of the first control signal is applied to the mobile station; and
when the unique identifier is included in the second control signal, adjusting, in accordance with the first information, the transmission timing of the mobile station with the group of cells specified by the second information,
wherein the first control signal is a Timing Advanced Command (TAC), and
wherein the second control signal is a Radio Resource Control (RRC) message.

9. The wireless communication method according to claim 8,
wherein when the unique identifier extracted from the second control signal is null, the controller is configured to ignore the second field of the first control signal.

10. The wireless communication method according to claim 8,
wherein when the unique identifier extracted from the second control signal is null, the controller is configured to adjust, using the first information included in the first control signal, the transmission timing of the mobile station with all of the plurality of groups of cells.

* * * * *